US012518702B2

(12) United States Patent
Kim et al.

(10) Patent No.: US 12,518,702 B2
(45) Date of Patent: Jan. 6, 2026

(54) DISPLAY DEVICE AND METHOD OF OPERATING A DISPLAY DEVICE

(71) Applicant: Samsung Display Co., LTD., Yongin-si (KR)

(72) Inventors: Daehyun Kim, Yongin-si (KR); Minki Yang, Yongin-si (KR); Il-Joo Kim, Yongin-si (KR); Sungyoon Hwang, Yongin-si (KR); Wonkyu Kwak, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/957,804

(22) Filed: Nov. 24, 2024

(65) Prior Publication Data

US 2025/0308446 A1 Oct. 2, 2025

(30) Foreign Application Priority Data

Mar. 26, 2024 (KR) ........................ 10-2024-0040771

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/028* (2013.01); *G09G 2320/068* (2013.01); *G09G 2358/00* (2013.01); *G09G 2380/10* (2013.01)

(58) Field of Classification Search
CPC ......... G09G 3/3233; G09G 2300/0819; G09G 2300/0852; G09G 2300/0861; G09G 2310/08; G09G 2320/028; G09G 2320/068; G09G 2358/00; G09G 2380/10
USPC .......................................................... 345/214
See application file for complete search history.

(56) References Cited

U.S. PATENT DOCUMENTS

| | | | | |
|---|---|---|---|---|
| 11,200,855 | B2 | 12/2021 | Fattal | |
| 2020/0005718 | A1 | 1/2020 | Fattal | |
| 2022/0399529 | A1 * | 12/2022 | Shin | G09G 3/3275 |
| 2023/0217763 | A1 * | 7/2023 | Hong | G09G 3/3258 |
| 2024/0196649 | A1 * | 6/2024 | Song | H10K 59/879 |
| 2024/0221670 | A1 * | 7/2024 | Lee | G09G 3/3233 |

(Continued)

FOREIGN PATENT DOCUMENTS

KR 1020150078714 A 7/2015

*Primary Examiner* — Tom V Sheng
(74) *Attorney, Agent, or Firm* — CANTOR COLBURN LLP

(57) ABSTRACT

A display device includes a display panel including a plurality of pixels, and a panel driver configured to drive the display panel. At least one pixel of the plurality of pixels includes a first light emitting element having a first viewing angle, a second light emitting element having a second viewing angle different from the first viewing angle, a pixel circuit configured to generate a driving current, a first transistor configured to provide the driving current to the first light emitting element in response to a first signal, and a second transistor configured to provide the driving current to the second light emitting element in response to a second signal. In response to a mode switching signal, the panel driver gradually changes an on-period ratio of at least one of the first signal and the second signal over a plurality of frame periods.

20 Claims, 23 Drawing Sheets

(56) References Cited

U.S. PATENT DOCUMENTS

| | | | | |
|---|---|---|---|---|
| 2024/0257719 | A1* | 8/2024 | Shin | G09G 3/3233 |
| 2025/0029556 | A1* | 1/2025 | Cho | G09G 3/3225 |
| 2025/0140176 | A1* | 5/2025 | Lee | G09G 3/32 |
| 2025/0218365 | A1* | 7/2025 | Yun | G09G 3/3233 |
| 2025/0218372 | A1* | 7/2025 | Choi | G09G 3/3233 |
| 2025/0218385 | A1* | 7/2025 | Yun | G09G 3/3266 |
| 2025/0218386 | A1* | 7/2025 | Kil | G09G 3/3291 |
| 2025/0252919 | A1* | 8/2025 | Shin | G09G 3/3233 |

* cited by examiner

DISPLAY DEVICE AND METHOD OF OPERATING A DISPLAY DEVICE

This application claims priority to Korean Patent Application No. 10-2024-0040771, filed on Mar. 26, 2024, and all the benefits accruing therefrom under 35 U.S.C. § 119, the content of which in its entirety is herein incorporated by reference.

BACKGROUND

1. Field

Embodiments of the invention relate to a display device, and more particularly to a display device that supports a public mode and a private mode, and a method of operating the display device.

2. Description of the Related Art

In general, a display device may display an image with a wide viewing angle such that not only a user positioned in front of the display device, but also a user positioned on the side of the display device can view the image. However, recently, to protect personal information or to ensure safety in a display device mounted in a vehicle, a private mode (or a privacy mode) has been developed in which the display device displays an image only to a user located in front of the display device. For example, a vehicle display device located corresponding to a passenger seat of a vehicle may operate not only in a public mode in which an image is displayed with a wide viewing angle such that the image is provided to both of a driver and a passenger, but also in a private mode in which an image is displayed with a narrow viewing angle such that the image is provided only to the passenger.

SUMMARY

Some embodiments provide a display device capable of providing smooth mode switching.

Some embodiments provide a method of operating a display device capable of providing smooth mode switching.

According to embodiments, there is provided a display device including a display panel including a plurality of pixels, and a panel driver configured to drive the display panel. At least one pixel of the plurality of pixels includes a first light emitting element having a first viewing angle, a second light emitting element having a second viewing angle different from the first viewing angle, a pixel circuit configured to generate a driving current, a first transistor configured to provide the driving current to the first light emitting element in response to a first signal, and a second transistor configured to provide the driving current to the second light emitting element in response to a second signal. In response to a mode switching signal, the panel driver gradually changes an on-period ratio of at least one of the first signal and the second signal over a plurality of frame periods.

In embodiments, the first viewing angle may be a wide viewing angle, and the second viewing angle may be a narrow viewing angle that is narrower than the first viewing angle.

In embodiments, the first light emitting element may be a public light emitting element configured to provide light to both of a first user located in front of the display device and a second user located on a side of the display device, and the second light emitting element may be a private light emitting element configured to provide light to the first user and not to provide the light to the second user.

In embodiments, the display device is mounted in a vehicle. When the vehicle changes from a stationary state to a moving state, the panel driver may receive the mode switching signal, which indicates switching from a public mode in which an image displayed by the display device is visible to both of a first user located in front of the display device and a second user located on a side of the display device to a private mode in which an image displayed by the display device is visible to the first user and invisible to the second user.

In embodiments, when the vehicle changes from the moving state to the stationary state, the panel driver may receive the mode switching signal, which indicates switching from the private mode to the public mode.

In embodiments, when the mode switching signal indicates switching from a public mode to a private mode, the panel driver may gradually decrease an on-period ratio of the first signal over a plurality of first frame periods, and may gradually increase an on-period ratio of the second signal over the plurality of first frame periods. When the mode switching signal indicates switching from the private mode to the public mode, the panel driver may gradually decrease the on-period ratio of the second signal over a plurality of second frame periods, and may gradually increase the on-period ratio of the first signal.

In embodiments, when the mode switching signal indicates switching from a public mode to an all-off mode, the panel driver may gradually decrease an on-period ratio of the first signal over a plurality of first frame periods. When the mode switching signal indicates switching from the all-off mode to a private mode, the panel driver may gradually increase an on-period ratio of the second signal over a plurality of second frame periods.

In embodiments, when the mode switching signal indicates switching from a private mode to an all-off mode, the panel driver may gradually decrease an on-period ratio of the second signal over a plurality of first frame periods. When the mode switching signal indicates switching from the all-off mode to a public mode, the panel driver may gradually increase an on-period ratio of the first signal over a plurality of second frame periods.

In embodiments, when the mode switching signal indicates switching from a public mode to a private mode, the panel driver may perform a first fade-out operation for switching from the public mode to an all-off mode by gradually decreasing an on-period ratio of the first signal over a plurality of first frame periods, and, after the first fade-out operation, may perform a first fade-in operation for switching from the all-off mode to the private mode by gradually increasing an on-period ratio of the second signal over a plurality of second frame periods. When the mode switching signal indicates switching from the private mode to the public mode, the panel driver may perform a second fade-out operation for switching from the private mode to the all-off mode by gradually decreasing the on-period ratio of the second signal over a plurality of third frame periods, and, after the second fade-out operation, may perform a second fade-in operation for switching from the all-off mode to the public mode by gradually increasing the on-period ratio of the first signal over a plurality of fourth frame periods.

In embodiments, the first signal may be a first global signal that is substantially simultaneously applied to the plurality of pixels, and the second signal may be a second global signal that is substantially simultaneously applied to the plurality of pixels.

In embodiments, the pixel circuit may include a third transistor including a gate, a first terminal connected to a first power supply voltage line, and a second terminal, a fourth transistor including a gate connected to a write signal line, a first terminal connected to a data line, and a second terminal, a first capacitor including a first electrode connected to the first power supply voltage line, and a second electrode connected to the second terminal of the fourth transistor, a second capacitor including a first electrode connected to the second terminal of the fourth transistor, and a second electrode connected to the gate of the third transistor, a fifth transistor including a gate connected to a compensation signal line, a first terminal connected to the second terminal of the third transistor, and a second terminal connected to the gate of the third transistor, a sixth transistor including a gate connected to an initialization signal line, a first terminal connected to the gate of the third transistor, and a second terminal connected to an initialization voltage line, a seventh transistor including a gate connected to the compensation signal line, a first terminal connected to the first electrode of the second capacitor, and a second terminal connected to a reference voltage line, an eighth transistor including a gate connected to an emission signal line, a first terminal connected to the second terminal of the third transistor, and a second terminal connected to the first and second transistors, a ninth transistor including a gate connected to a bypass signal line, a first terminal connected to the first light emitting element, and a second terminal connected to an anode initialization voltage line, and a tenth transistor including a gate connected to the bypass signal line, a first terminal connected to the second light emitting element, and a second terminal connected to the anode initialization voltage line. The first transistor may include a gate connected to a first global signal line, a first terminal connected to the second terminal of the eighth transistor, and a second terminal connected to the first light emitting element, and the second transistor may include a gate connected to a second global signal line, a first terminal connected to the second terminal of the eighth transistor, and a second terminal connected to the second light emitting element.

In embodiments, the pixel circuit may include a third transistor including a gate, a first terminal, and a second terminal, a fourth transistor including a gate connected to a write signal line, a first terminal connected to a data line, and a second terminal connected to the first terminal of the third transistor, a fifth transistor including a gate connected to a compensation signal line, a first terminal connected to the second terminal of the third transistor, and a second terminal connected to the gate of the third transistor, a first capacitor including a first electrode connected to a first power supply voltage line, and a second electrode connected to the gate of the third transistor, a sixth transistor including a gate connected to an initialization signal line, a first terminal connected to the gate of the third transistor, and a second terminal connected to an initialization voltage line, a seventh transistor including a gate connected to an emission signal line, a first terminal connected to the first power supply voltage line, and a second terminal connected to the first terminal of the third transistor, an eighth transistor including a gate connected to the emission signal line, a first terminal connected to the second terminal of the third transistor, and a second terminal connected to the first and second transistors, a ninth transistor including a gate connected to a bypass signal line, a first terminal connected to the first light emitting element, and a second terminal connected to an anode initialization voltage line, and a tenth transistor including a gate connected to the bypass signal line, a first terminal connected to the second light emitting element, and a second terminal connected to the anode initialization voltage line. The first transistor may include a gate connected to a first global signal line, a first terminal connected to the second terminal of the eighth transistor, and a second terminal connected to the first light emitting element, and the second transistor may include a gate connected to a second global signal line, a first terminal connected to the second terminal of the eighth transistor, and a second terminal connected to the second light emitting element.

In embodiments, the first signal may be a first emission signal, which is sequentially applied to the plurality of pixels on a row basis, and the second signal may be a second emission signal, which is sequentially applied to the plurality of pixels on a row basis.

In embodiments, the pixel circuit may include a third transistor including a gate, a first terminal connected to a first power supply voltage line, and a second terminal connected to the first and second transistors, a fourth transistor including a gate connected to a write signal line, a first terminal connected to a data line, and a second terminal, a first capacitor including a first electrode connected to the first power supply voltage line, and a second electrode connected to the second terminal of the fourth transistor, a second capacitor including a first electrode connected to the second terminal of the third transistor, and a second electrode connected to the gate of the fourth transistor, a fifth transistor including a gate connected to a compensation signal line, a first terminal connected to the second terminal of the third transistor, and a second terminal connected to the gate of the third transistor, a sixth transistor including a gate connected to an initialization signal line, a first terminal connected to the gate of the third transistor, and a second terminal connected to an initialization voltage line, a seventh transistor including a gate connected to the compensation signal line, a first terminal connected to the first electrode of the second capacitor, and a second terminal connected to a reference voltage line, a ninth transistor including a gate connected to a bypass signal line, a first terminal connected to the first light emitting element, and a second terminal connected to an anode initialization voltage line, and a tenth transistor including a gate connected to the bypass signal line, a first terminal connected to the second light emitting element, and a second terminal connected to the anode initialization voltage line. The first transistor may include a gate connected to a first emission signal line, a first terminal connected to the second terminal of the third transistor, and a second terminal connected to the first light emitting element, and the second transistor may include a gate connected to a second emission signal line, a first terminal connected to the second terminal of the third transistor, and a second terminal connected to the second light emitting element.

In embodiments, the pixel circuit may include a third transistor including a gate, a first terminal, and a second terminal, a fourth transistor including a gate connected to a write signal line, a first terminal connected to a data line, and a second terminal connected to the first terminal of the third transistor, a fifth transistor including a gate connected to a compensation signal line, a first terminal connected to the second terminal of the third transistor, and a second terminal connected to the gate of the third transistor, a first capacitor including a first electrode connected to a first power supply voltage line, and a second electrode connected to the gate of the third transistor, a sixth transistor including a gate connected to an initialization signal line, a first terminal connected to the gate of the third transistor, and a second terminal connected to an initialization voltage line, a seventh transistor including a gate connected to an emission signal line, a first terminal connected to the first power supply voltage line, and a second terminal connected to the first terminal of the third transistor, a ninth transistor including a gate connected to a bypass signal line, a first terminal connected to the first light emitting element, and a second terminal connected to an anode initialization voltage line, and a tenth transistor including a gate connected to the bypass signal line, a first terminal connected to the second light emitting element, and a second terminal connected to the anode initialization voltage line.

The first transistor may include a gate connected to a first emission signal line, a first terminal connected to the second terminal of the third transistor, and a second terminal connected to the first light emitting element, and the second transistor may include a gate connected to a second emission signal line, a first terminal connected to the second terminal of the third transistor, and a second terminal connected to the second light emitting element.

According to embodiments, there is provided a method of operating a display device in which at least one pixel includes first and second light emitting elements having different viewing angles from each other. In the method, a mode switching signal is received, and an on-period ratio of at least one of a first signal for providing a driving current to the first light emitting element and a second signal for providing the driving current to the second light emitting element is gradually changed over a plurality of frame periods.

In embodiments, to receive the mode switching signal, a first mode switching signal indicating switching from a public mode to a private mode may be received. To gradually change the on-period ratio of at least one of the first signal and the second signal, an on-period ratio of the first signal may be gradually decreased over a plurality of first frame periods in response to the first mode switching signal, and an on-period ratio of the second signal may be gradually increased over the plurality of first frame periods in response to the first mode switching signal.

In embodiments, to receive the mode switching signal, a second mode switching signal indicating switching from the private mode to the public mode may be received. To gradually change the on-period ratio of at least one of the first signal and the second signal, the on-period ratio of the second signal may be gradually decreased over a plurality of second frame periods in response to the second mode switching signal, and the on-period ratio of the first signal may be gradually increased over the plurality of second frame periods in response to the second mode switching signal.

In embodiments, to receive the mode switching signal, a first mode switching signal indicating switching from a public mode to an all-off mode may be received, and a second mode switching signal indicating switching from the all-off mode to a private mode may be received. To gradually change the on-period ratio of at least one of the first signal and the second signal, an on-period ratio of the first signal may be gradually decreased over a plurality of first frame periods in response to the first mode switching signal, and an on-period ratio of the second signal may be gradually increased over a plurality of second frame periods in response to the second mode switching signal.

In embodiments, to receive the mode switching signal, a third mode switching signal indicating switching from the private mode to the all-off mode may be received, and a fourth mode switching signal indicating switching from the all-off mode to the public mode may be received. To gradually change the on-period ratio of at least one of the first signal and the second signal, the on-period ratio of the second signal may be gradually decreased over a plurality of third frame periods in response to the third mode switching signal, and the on-period ratio of the first signal may be gradually increased over a plurality of fourth frame periods in response to the fourth mode switching signal.

As described above, in a display device and a method of operating the display device according to embodiments, at least one pixel may include first and second light emitting elements having different viewing angles, and an on-period ratio of a first signal for providing a driving current to the first light emitting element and a second signal for providing a driving current to the second light emitting element may be gradually changed over a plurality of frame periods. Accordingly, the display device according to embodiments may perform smooth mode switching.

BRIEF DESCRIPTION OF THE DRAWINGS

Illustrative, non-limiting embodiments will be more clearly understood from the following detailed description in conjunction with the accompanying drawings.

DESCRIPTION OF EMBODIMENTS

Figure 1:
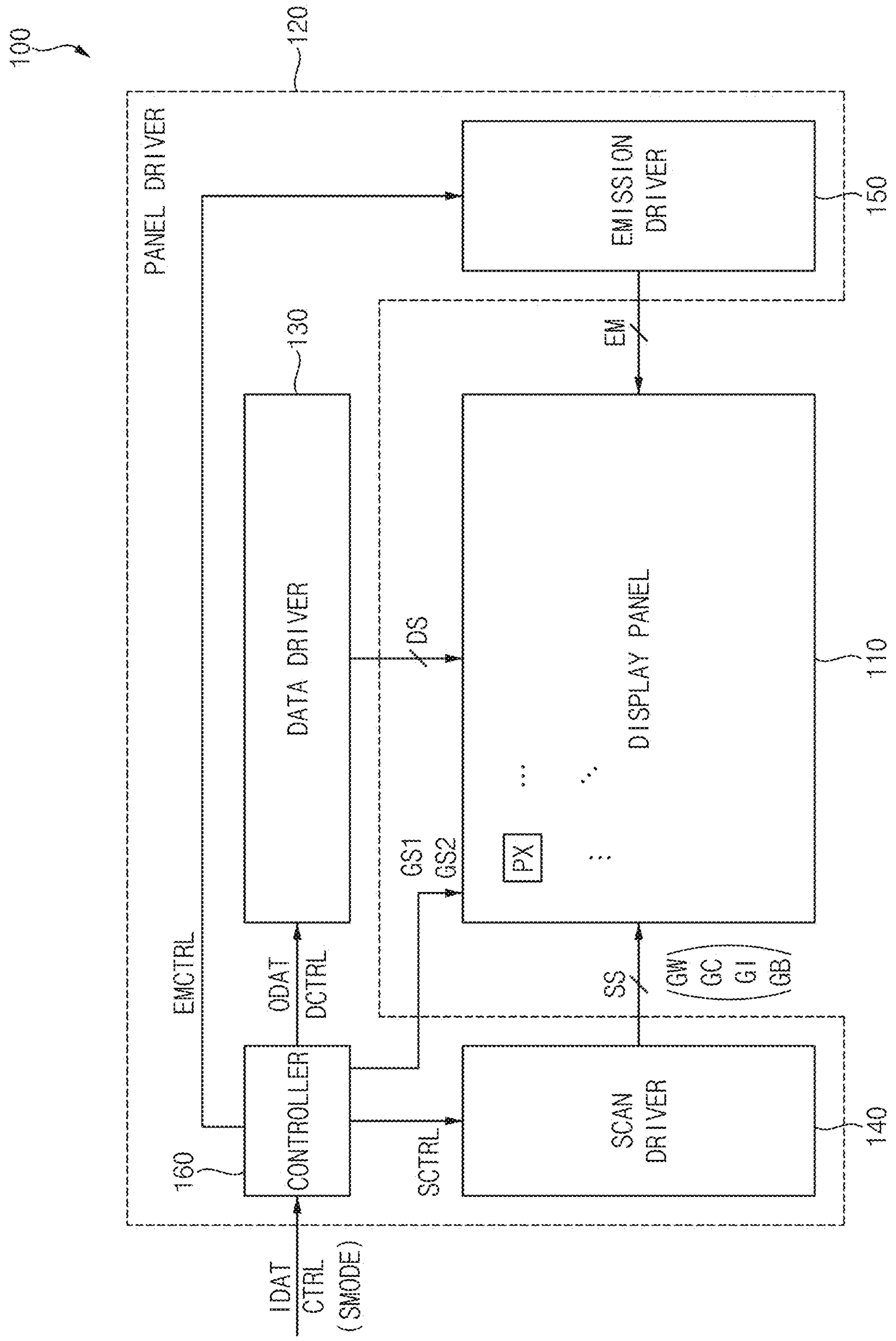
FIG. 1 is a block diagram illustrating a display device according to embodiments.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The embodiments are described more fully hereinafter with reference to the accompanying drawings. Like or similar reference numerals refer to like or similar elements throughout.

Figure 2:
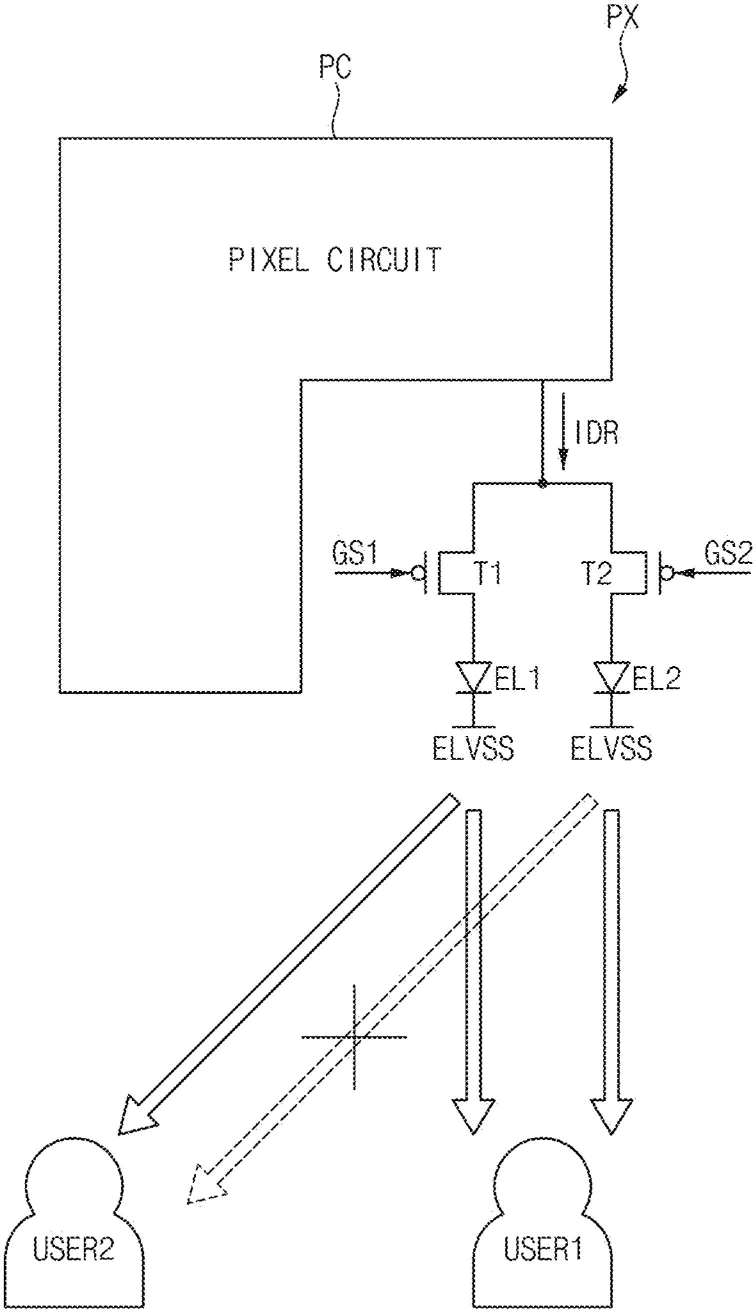
FIG. 2 is a diagram illustrating at least one pixel included in a display device according to embodiments.
Figure 3:
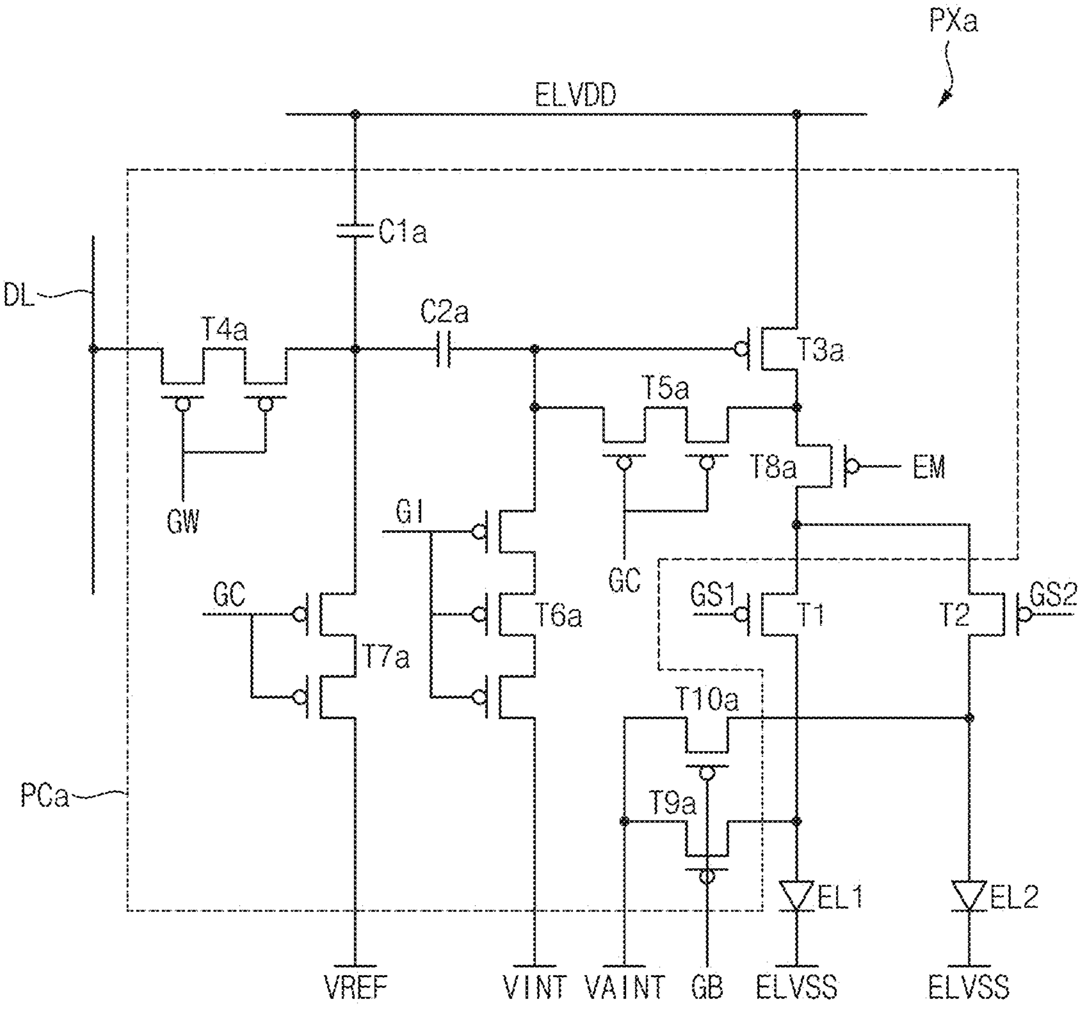
FIG. 3 is a circuit diagram illustrating an example of at least one pixel included in a display device according to embodiments.
Figure 4:
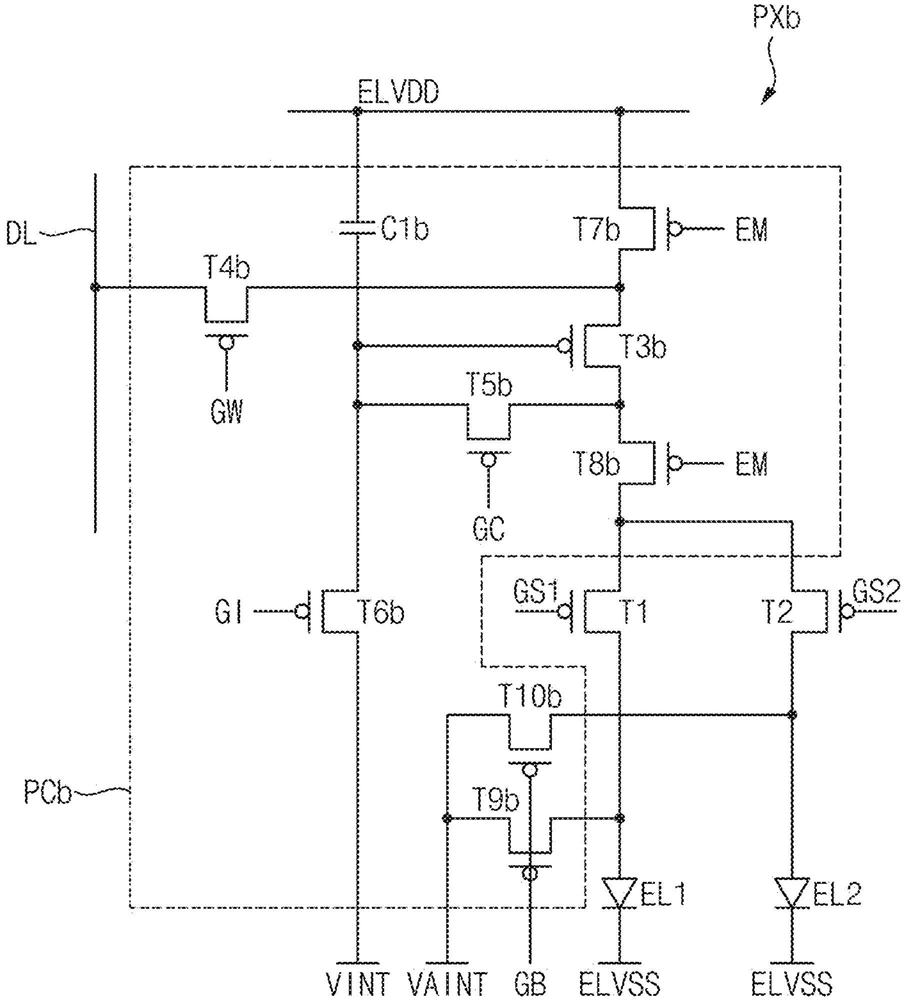
FIG. 4 is a circuit diagram illustrating another example of at least one pixel included in a display device according to embodiments.
Figure 5:
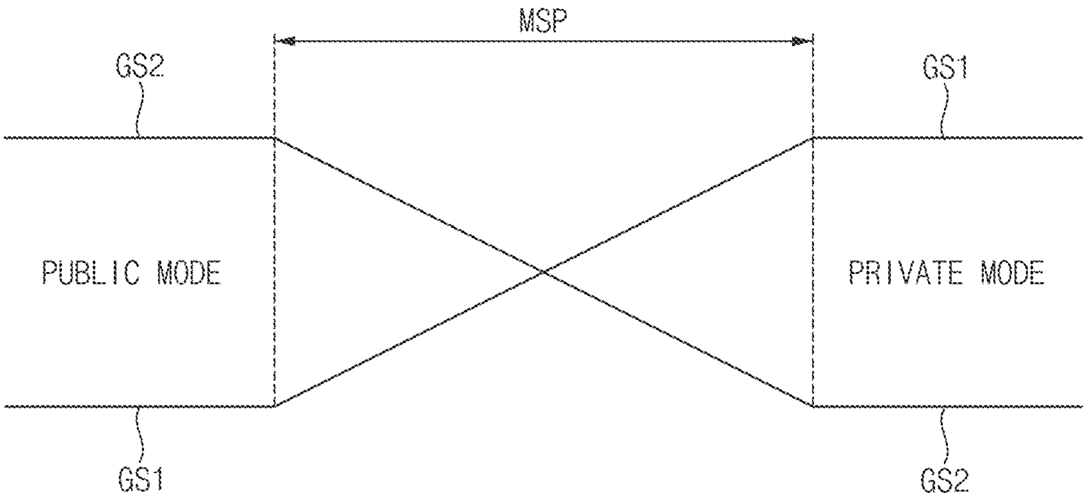
FIG. 5 is a timing diagram illustrating an example in which voltage levels of a first global signal and a second global signal are gradually changed in a mode switching period.
Figure 6:
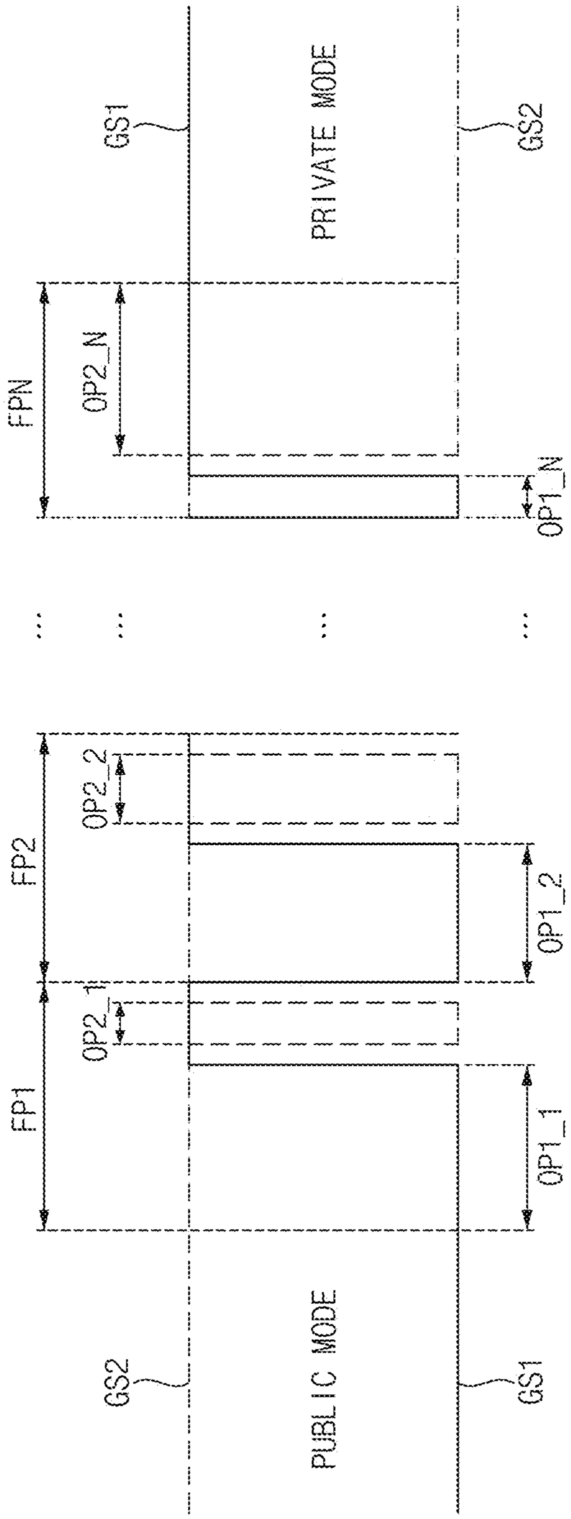
FIG. 6 is a timing diagram illustrating a first global signal and a second global signal in a case where a mode of a display device is switched from a public mode to a private mode according to embodiments.

FIG. 1 is a block diagram illustrating a display device according to embodiments, FIG. 2 is a diagram illustrating at least one pixel included in a display device according to embodiments, FIG. 3 is a circuit diagram illustrating an example of at least one pixel included in a display device according to embodiments, FIG. 4 is a circuit diagram illustrating another example of at least one pixel included in a display device according to embodiments, FIG. 5 is a timing diagram illustrating an example in which voltage levels of a first global signal and a second global signal are gradually changed in a mode switching period, and FIG. 6 is a timing diagram illustrating a first global signal and a second global signal in a case where a mode of a display device is switched from a public mode to a private mode according to embodiments.

Referring to FIG. 1, a display device 100 according to embodiments may include a display panel 110 that includes a plurality of pixels PX, and a panel driver 120 that drives the display panel 110. In some embodiments, the panel driver 120 may include a data driver 130 that provides data signals DS to the plurality of pixels PX, a scan driver 140 that provides scan signals SS to the plurality of pixels PX, an emission driver 150 that provides emission signals EM to the plurality of pixels PX, and a controller 160 that controls an operation of the display device 100 and provides first and second global signals GS1 and GS2 to the plurality of pixels PX.

The display panel 110 may include a plurality of data lines, a plurality of scan lines, a plurality of emission lines, and the plurality of pixels PX connected thereto. In some embodiments, as illustrated in FIG. 2, at least one pixel PX of the plurality of pixels PX may include a first light emitting element EL1, a second light emitting element EL2, a pixel circuit PC, a first transistor T1 and a second transistor T2.

The first light emitting element EL1 may have a first viewing angle, and the second light emitting element EL2 may have a second viewing angle different from the first viewing angle. Here, the viewing angle of a light emitting element may be a viewing angle of a light emitted from the light emitting element. In some embodiments, the first viewing angle may be a relatively wide viewing angle, and the second viewing angle may be a relatively narrow viewing angle. For example, to have the narrow viewing angle, the second light emitting element EL2 may include, but is not limited to, a light emitting layer, and a partition for preventing light emitted by the light emitting layer from spreading to the side. Further, in some embodiments, each of the first and second light emitting elements EL1 and EL2 may be, but is not limited to, an organic light emitting diode ("OLED"). In other embodiments, each of the first and second light emitting elements EL1 and EL2 may be any suitable light emitting element. For example, each of the first and second light emitting elements EL1 and EL2 may be a micro light emitting diode, a nano light emitting diode ("NED"), a quantum dot ("QD") light emitting diode, an inorganic light emitting diode, or any other suitable light emitting element. In some embodiments, the first light emitting element EL1 may include an anode connected to the first transistor T1, and a cathode connected to and a second power supply voltage line which transfers a second power supply voltage ELVSS (e.g., a low power supply voltage), and the second light emitting element EL2 may include an anode connected to the second transistor T2, and a cathode connected to the second power supply voltage line.

The pixel circuit PC may generate a driving current IDR based on the scan signal SS, the emission signal EM and the data signal DS. In some embodiments, as illustrated in FIG. 3, a pixel PXa may include the first light emitting element EL1, the second light emitting element EL2, the first transistor T1, the second transistor T2 and a pixel circuit PCa, and the pixel circuit PCa may include a third transistor T3*a*, a fourth transistor T4*a*, a first capacitor C1*a*, a second capacitor C2*a*, a fifth transistor T5*a*, and a sixth transistor T6*a*, a seventh transistor T7*a*, an eighth transistor T8*a*, a ninth transistor T9*a* and a tenth transistor T10*a*.

The third transistor T3*a* may be a driving transistor for generating the driving current IDR. In some embodiments, the third transistor T3*a* may include a gate connected to the second capacitor C2*a*, a first terminal connected to a first power supply voltage line which transfers a first power supply voltage ELVDD (e.g., a high power supply voltage), and a second terminal connected to the fifth and eighth transistors T5*a* and T8*a*.

The fourth transistor T4*a* may transfer the data signal DS of the data line DL to the first and second capacitors C1*a* and C2*a* in response to a write signal GW. In some embodiments, the fourth transistor T4*a* may include a gate connected to a write signal line which transfers the write signal GW, a first terminal connected to the data line DL, and a second terminal connected to the first and second capacitors C1*a* and C2*a*.

The first capacitor C1*a* may store the data signal DS transferred through the fourth transistor T4*a*. For example, the first capacitor C1*a* may be a storage capacitor. In some embodiments, the first capacitor C1*a* may include a first electrode connected to the first power supply voltage line, and a second electrode connected to the second terminal of the fourth transistor T4*a*.

The second capacitor C2*a* may be connected between the second electrode of the first capacitor C1*a* and the gate of the third transistor T3*a*. For example, the second capacitor C2*a* may be a hold capacitor. In some embodiments, the second capacitor C2*a* may include a first electrode connected to the second terminal of the fourth transistor T4*a* and the second electrode of the first capacitor C1*a*, and a second electrode connected to the gate of the third transistor T3*a*. Thus, when a voltage of the first electrode of the second capacitor C2*a* is changed from a reference voltage VREF to the data signal DS, a voltage of the second electrode of the second capacitor C2*a* also may be changed by a voltage difference between the reference voltage VREF and the data signal DS (e.g., from a voltage obtained by subtracting an absolute value of a threshold voltage of the third transistor T3*a* from the first power supply voltage ELVDD).

The fifth transistor T5*a* may diode-connect the third transistor T3*a* in response to a compensation signal GC. For example, when the third transistor T3*a* is diode-connected, the voltage of the second electrode of the second capacitor C2*a* may be changed (e.g., from an initialization voltage VINT) to the voltage obtained by subtracting the absolute value of the threshold voltage of the third transistor T3*a* from the first power supply voltage ELVDD. This operation may be referred to as a threshold voltage compensation operation, and may be performed before the data signal DS is transferred by the fourth transistor T4*a*. In some embodiments, the fifth transistor T5*a* may include a gate connected to a compensation signal line which transfers the compensation signal GC, a first terminal connected to the second terminal of the third transistor T3*a*, and a second terminal connected to the gate of the third transistor T3*a*.

The sixth transistor Toa may transfer the initialization voltage VINT to the gate of the third transistor T3*a* and the second electrode of the second capacitor C2*a* in response to an initialization signal GI. In some embodiments, the sixth transistor T6*a* may include a gate connected to an initialization signal line which transfers the initialization signal GI, a first terminal connected to the gate of the third transistor T3*a* and the second electrode of the second capacitor C2*a*, and a second terminal connected to an initialization voltage line which transfers the initialization voltage VINT.

The seventh transistor T7*a* may transfer the reference voltage VREF to the second electrode of the first capacitor C1*a* and the first electrode of the second capacitor C2*a* in response to the compensation signal GC. In some embodiments, the seventh transistor T7*a* may include a gate connected to the compensation signal line, a first terminal connected to the second electrode of the first capacitor C1*a* and the first electrode of the second capacitor C2*a*, and a second terminal connected to a reference voltage line which transfers the reference voltage VREF.

The eighth transistor T8*a* may connect the third transistor T3*a* to the first and second transistors T1 and T2 in response to the emission signal EM. In some embodiments, the eighth transistor T8*a* may include a gate connected to an emission signal line which transfers the emission signal EM, a first terminal connected to the second terminal of the third transistor T3*a*, and a second terminal connected to the first and second transistors T1 and T2.

The ninth transistor T9*a* may provide an anode initialization voltage VAINT to the first light emitting element EL1 in response to a bypass signal GB, and the tenth transistor T10*a* may provide the anode initialization voltage VAINT to the second light emitting element EL2 in response to the bypass signal GB. In some embodiments, the ninth transistor T9*a* may include a gate connected to a bypass signal line which transfers the bypass signal GB, a first terminal connected to the first light emitting element EL1, and a second terminal connected to an anode initialization voltage line which transfers the anode initialization voltage VAINT, and the tenth transistor T10*a* may include a gate connected to the bypass signal line, a first terminal connected to the second light emitting element EL2, and a second terminal connected to the anode initialization voltage line.

In some embodiments, as illustrated in FIG. 3, the first through tenth transistors T1 through T10*a* may be P-type metal-oxide-semiconductor (PMOS) transistors. In other embodiments, at least one of the first through tenth transistors T1 through T10*a* may be an N-type metal-oxide-semiconductor (NMOS) transistor. For example, the first, second, third, eighth, ninth and tenth transistors T1, T2, T3*a*, T8*a*, T9*a* and T10*a* may be PMOS transistors, and the fourth, fifth, sixth and seventh transistors T4*a*, T5*a*, Toa and Ta may be NMOS transistors, but are not limited thereto.

Further, in some embodiments, at least one of the first through tenth transistors T1 through T10*a* may include a plurality of sub-transistors connected in series. For example, as illustrated in FIG. 3, each of the fourth, fifth and seventh transistors T4$a$, T5$a$ and T7$a$ may include two sub-transistors connected in series, and the sixth transistor T6$a$ may include three sub-transistors connected in series. In this case, since the fourth, fifth, sixth and seventh transistors T4$a$, T5$a$, Toa and T7$a$ of which one terminals (e.g., sources and/or drains) are connected to the first and/or second capacitors C1$a$ and C2$a$, leakage currents through the fourth, fifth, sixth and seventh transistors T4$a$, T5$a$, T6$a$ and T7$a$ may be reduced, and distortions of voltages stored in the first and/or second capacitors C1$a$ and C2$a$ may be prevented or reduced.

In other embodiments, as illustrated in FIG. 4, a pixel PXb may include the first light emitting element EL1, the second light emitting element EL2, the first transistor T1, the second transistor T2 and a pixel circuit PCb, and the pixel circuit PCb may include a third transistor T3$b$, a fourth transistor T4$b$, a fifth transistor T5$b$, a first capacitor C1$b$, a sixth transistor T6$b$, a seventh transistor T7$b$, an eighth transistor T8$b$, a ninth transistor T9$b$ and a tenth transistor T10$b$.

The third transistor T3$b$ may be a driving transistor for generating the driving current IDR. In some embodiments, the third transistor T3$b$ may include a gate connected to the first capacitor C1$b$, a first terminal connected to the fourth and seventh transistors T4$b$ and T7$b$, and a second terminal connected to the fifth and eighth transistors T5$b$ and T8$b$.

The fourth transistor T4$b$ may transfer the data signal DS of the data line DL to the first terminal of the third transistor T3$b$ in response to the write signal GW. In some embodiments, the fourth transistor T4$b$ may include a gate connected to the write signal line, a first terminal connected to the data line DL, and a second terminal connected to the first terminal of the third transistor T3$b$.

The fifth transistor T5$b$ may diode-connect the third transistor T3$b$ in response to the compensation signal GC. In some embodiments, the fifth transistor T5$b$ may include a gate connected to the compensation signal line, a first terminal connected to the second terminal of the third transistor T3$b$, and a second terminal connected to the gate of the third transistor T3$b$.

The first capacitor C1$b$ may store the data signal DS transferred through the fourth transistor T4$b$ and the diode-connected third transistor T3$b$. In some embodiments, the first capacitor C1$b$ includes the first electrode connected to the first power supply voltage line, and a second electrode connected to the gate of the third transistor T3$b$.

The sixth transistor T6$b$ may transfer the initialization voltage VINT to the gate of the third transistor T3$b$ and the second electrode of the first capacitor C1$b$ in response to the initialization signal GI. In some embodiments, the sixth transistor T6$b$ may include a gate connected to the initialization signal line, a first terminal connected to the gate of the third transistor T3$b$ and the second electrode of the first capacitor C1$b$, a second terminal connected to the initialization voltage line.

The seventh transistor T7$b$ may connect the first power supply voltage line to the third transistor T3$b$ in response to the emission signal EM, and the eighth transistor T8$b$ may connect the third transistor T3$b$ to the first and second transistors T1 and T2 in response to the emission signal EM. In some embodiments, the seventh transistor T7$b$ may include a gate connected to the emission signal line, a first terminal connected to the first power supply voltage line, and a second terminal connected to the first terminal of the third transistor T3$b$, and the eighth transistor T8$b$ may include a gate connected to the emission signal line, a first terminal connected to the second terminal of the third transistor T3$b$, and a second terminal connected to the first and second transistors T1 and T2.

The ninth transistor T9$b$ may provide the anode initialization voltage VAINT to the first light emitting element EL1 in response to the bypass signal GB, and the tenth transistor T10$b$ may provide the anode initialization voltage VAINT to the second light emitting element EL2 in response to the bypass signal GB. In some embodiments, the ninth transistor T9$b$ may include a gate connected to the bypass signal line, a first terminal connected to the first light emitting element EL1, and a second terminal connected to the anode initialization voltage line, and the tenth transistor T10$b$ may include a gate connected to the bypass signal line, a first terminal connected to the second light emitting element EL2, and a second terminal connected to the anode initialization voltage line.

In some embodiments, as illustrated in FIG. 4, the first through tenth transistors T1 through T10$b$ may be PMOS transistors. In other embodiments, at least one of the first through tenth transistors T1 through T10$b$ may be an NMOS transistor. Further, in some embodiments, at least one of the first through tenth transistors T1 through T10$b$ may include a plurality of sub-transistors connected in series.

Although FIG. 3 illustrates an example in which the pixel circuit PCa includes the third through tenth transistors T3$a$ through T10$a$ and the first and second capacitors C1$a$ and C2$a$, and FIG. 4 illustrates an example in which the pixel circuit PCb includes the third through tenth transistors T3$b$ to T10$b$ and the first capacitor C1$b$, the pixel circuit PC of the pixel PX of the display device 100 according to embodiments is not limited to the examples of FIGS. 3 and 4, and may have any circuit configuration that generates the driving current IDR.

Referring to FIG. 2, the first transistor T1 may provide the driving current IDR to the first light emitting element EL1 in response to a first signal (e.g., GS1 in FIG. 3), and the second transistor T2 may provide the driving current IDR to the second light emitting element EL2 in response to a second signal (e.g., GS2 in FIG. 3). In some embodiments, the first signal may be the first global signal GS1 substantially simultaneously applied to the plurality of pixels PX, and the second signal may be the second global signal GS2 substantially simultaneously applied to the plurality of pixels PX. In some embodiments, the first and second global signals GS1 and GS2 may be generated by the controller 160, and may be directly applied from the controller 160 to the plurality of pixels PX. In other embodiments, the display device 100 may further include a level shifter (or level shifter integrated circuit) that converts voltage levels of the first and second global signals GS1 and GS2 generated by the controller 160 into voltage levels suitable for the plurality of pixels PX, and the first and second global signals GS1 and GS2 may be provided from the controller 160 to the plurality of pixels PX through the level shifter. In still other embodiments, the display device 100 may further include a power management circuit (or a power management integrated circuit), and the first and second global signals GS1 and GS2 may be provided from the controller 160 to the plurality of pixels PX through the power management circuit. In still other embodiments, the first and second global signals GS1 and GS2 may be provided from the controller 160 to the plurality of pixels PX through the level shifter and the power management circuit.

In some embodiments, each pixel PX of the display device 100 may be the pixel PXa illustrated in FIG. 3, the first transistor T1 may include a gate connected to a first global signal line which transfers the first global signal GS1, a first terminal connected to the second terminal of the eighth transistor T8*a*, and a second terminal connected to the first light emitting element EL1, and the second transistor T2 may include a gate connected to a second global signal line which transfers the second global signal GS2, a first terminal connected to the second terminal of the eighth transistor T8*a*, and a second terminal connected to the second light emitting element EL2.

In other embodiments, each pixel PX of the display device 100 may be the pixel PXb illustrated in FIG. 4, the first transistor T1 may include a gate connected to the first global signal line, a first terminal connected to the second terminal of the eighth transistor T8*b*, and a second terminal connected to the first light emitting element EL1, and the second transistor T2 may include a gate connected to the second global signal line, a first terminal connected to the second terminal of the eighth transistor T8*b*, and a second terminal connected to the second light emitting element EL2.

When the first global signal GS1 has an on-level (e.g., a low level) and the second global signal GS2 has an off-level (e.g., a high level), the first transistor T1 may be turned on, and the second transistor T2 may be turned off, respectively. Thus, the driving current IDR generated by the pixel circuit PC (or the third transistor T3*a* and T3*b* illustrated in FIGS. 3 and 4) may be provided to the first light emitting element EL1, and the first light emitting element EL1 having the wide viewing angle may emit light based on the driving current IDR. In some embodiments, the first light emitting element EL1 may be configured to provide the light to both of a first user USER1 located in the front of the display device 100 and a second user USER2 located on the side of the display device 100. This light emitting element may be referred to as a "public light emitting element." Accordingly, while the first global signal GS1 has the on-level, the image displayed by the display device 100 may be viewed by both of the first user USER1 and the second user USER2. In some embodiments, a mode of the display device 100 in which the image displayed by the display device 100 is visible to both of the first user USER1 located in the front of the display device 100 and the second user USER2 located on the side of the display device 100 may be referred to as a "public mode."

In contrast, when the first global signal GS1 has the off-level, and the second global signal GS2 has the on-level, the first transistor T1 may be turned off, and the second transistor T2 may be turned on. Thus, the driving current IDR generated by the pixel circuit PC (or the third transistor T3*a* and T3*b* illustrated in FIGS. 3 and 4) may be provided to the second light emitting element EL2, and the second light emitting element EL2 having the narrow viewing angle may emit light based on the driving current IDR. In some embodiments, the second light emitting element EL2 may be configured to provide the light to the first user USER1 located in the front of the display device 100, but not to provide the light to the second user USER2 located on the side of the display device 100. This light emitting element may be referred to as a "private light emitting element." Accordingly, while the first global signal GS1 has the off-level, and the second global signal GS2 has the on-level, the image displayed by the display device 100 may be visible to of the first user USER1, but may be invisible to the second user USER2. In some embodiments, a mode of the display device 100 in which the image displayed by the display device 100 is visible to the first user USER1 located in the front of the display device 100, and is invisible to the second user USER2 located on the side of the display device 100 may be referred to as a "private mode."

In some embodiments, each of all the pixels PX of the display panel 110 may include the first and second light emitting elements EL1 and EL2 having different viewing angles illustrated in FIGS. 2 through 4. In other embodiments, each of a portion of the pixels PX may include the first and second light emitting elements EL1 and EL2 having different viewing angles, and each of the remaining pixels PX may include only one light emitting element.

Referring again to FIG. 1, the data driver 130 may generate the data signals DS based on output image data ODAT and a data control signal DCTRL received from the controller 160, and may provide the data signals DS to the plurality of pixels PX. In some embodiments, the data control signal DCTRL may include, but is not limited to, an output data enable signal, a horizontal start signal, and a load signal. Further, in some embodiments, the data driver 130 and the controller 160 may be implemented as a single integrated circuit, and the single integrated circuit may be referred to as a timing controller embedded data driver ("TED"). In other embodiments, the data driver 130 and the controller 160 may be implemented as separate integrated circuits.

The scan driver 140 may generate the scan signals SS based on a scan control signal SCTRL received from the controller 160, and may sequentially provide the scan signals SS to the plurality of pixels PX on a row basis. In some embodiments, the scan control signal SCTRL may include, but is not limited to, a scan start signal and a scan clock signal. Further, in some embodiments, the scan signal SS applied to each pixel PX may include, but is not limited to, the write signal GW, the compensation signal GC, the initialization signal GI and the bypass signal GB. In some embodiments, the scan driver 140 may be integrated or formed in the display panel 110. In other embodiments, the scan driver 140 may be implemented as an integrated circuit.

The emission driver 150 may generate the emission signals EM based on an emission control signal EMCTRL received from the controller 160, and may sequentially provide the emission signals EM to the plurality of pixels PX on a row basis. In some embodiments, the emission control signal EMCTRL may include, but is not limited to, an emission start signal and an emission clock signal. In some embodiments, the emission driver 150 may be integrated or formed in the display panel 110. In other embodiments, the emission driver 150 may be implemented as an integrated circuit.

The controller 160 (e.g., a timing controller) may receive input image data IDAT and a control signal CTRL from an external host processor (e.g., an application processor (AP), a graphics processing unit (GPU), a graphics card, etc.). The control signal CTRL may include a mode switching signal SMODE indicating switching from a first mode of the display device 100 to a second mode of the display device 100. In some embodiments, the control signal CTRL may further include, but is not limited to, a vertical synchronization signal, a horizontal synchronization signal, an input data enable signal and a master clock signal. The controller 160 may generate the output image data ODAT, the data control signal DCTRL, the scan control signal SCTRL and the emission control signal EMCTRL based on the input image data IDAT and the control signal CTRL. The controller 160 may control an operation of the data driver 130 by providing the output image data ODAT and the data control signal DCTRL to the data driver 130, may control an operation of the scan driver 140 by providing the scan control signal SCTRL to the scan driver 140, and may control an operation of the emission driver 150 by providing the emission control signal EMCTRL to the emission driver 150.

In the display device 100 according to embodiments, the panel driver 120 (or the controller 160) may receive the mode switching signal SMODE indicating or requesting that the mode of display device 100 is switched from the first mode (or a current mode) to the second mode (or the next mode) from the host processor. In some embodiments, to indicate switching from the current mode to the next mode, the mode switching signal SMODE may have a value indicating the next mode. In other embodiments, the mode switching signal SMODE may have a first value indicating the current mode and a second value indicating the next mode. Further, in some embodiments, the mode of the display device 100 may include the public mode, the private mode and an all-off mode. For example, in the public mode, the first light emitting elements EL1 of the plurality of pixels PX of the display panel 110 may emit light, and the image displayed by the display device 100 may be visible to both of the first user USER1 located in the front of the display device 100 and the second user USER2 located on the side of the display device 100. Further, in the private mode, the second light emitting elements EL2 of the plurality of pixels PX of the display panel 110 may emit light, and the image displayed by the display device 100 may be visible to the first user USER1 located in the front of the display device 100 and invisible to the second user USER2 located on the side of the display device 100. Further, in the all-off mode, the first and second light emitting elements EL1 and EL2 of the plurality of pixels PX of the display panel 110 may not emit light, and the image may not be displayed by the display device 100.

In some embodiments, the display device 100 may be a vehicle display device mounted in a vehicle. When the vehicle changes from a stationary state to a moving state, for example, when a gear of the vehicle changes from a parking mode or a neutral mode to a drive mode or a reverse mode, the panel driver 120 may receive the mode switching signal SMODE indicating switching from the public mode to the private mode. Further, when the vehicle changes from the moving state to the stationary state, for example, when the gear of the vehicle changes from the driving mode or the reverse mode to the parking mode or the neutral mode, the panel driver 120 may receive the mode switching signal SMODE indicating switching from the private mode to the public mode.

In response to the mode switching signal SMODE, to switch the mode of the display device 100 from the first mode (e.g., one of the public mode, the private mode and the all-off mode) to the second mode (e.g., another one of the public mode, the private mode and the all-off mode), the panel driver 120 (or the controller 160) may change the first global signal GS1 and/or the second global signal GS2. Further, to provide gradual mode switching from the first mode to the second mode, as illustrated in FIG. 5, the panel driver 120 (or the controller 160) may gradually change voltage levels of the first global signal GS1 and the second global signal GS2 in a mode switching period MSP between the first mode and the second mode. For example, as illustrated in FIG. 5, when the mode switching signal SMODE indicates switching from the public mode to the private mode, the panel driver 120 (or the controller 160) may gradually change the voltage level of the first global signal GS1 from an on-level (e.g., a low level) to an off-level (e.g., a high level), and may gradually change the voltage level of the second global signal GS2 from the off-level to the on-level. However, in this case, the first transistors T1 of the plurality of pixels PX may have different threshold voltages, and thus the first transistors T1 of the plurality of pixels PX may be turned off at different times within the mode switching period MSP. Further, the second transistors T2 of the plurality of pixels PX may have different threshold voltages, and thus the second transistors T2 of the plurality of pixels PX may be turned on at different times within the mode switching period MSP. Accordingly, in a case where the voltage levels of the first global signal GS1 and the second global signal GS2 are gradually changed in the mode switching period MSP as illustrated in FIG. 5, a Mura defect may occur in the display panel 110 due to the threshold voltage distribution of the first and second transistors T1 and T2 of the plurality of pixels PX.

However, in the display device 100 according to embodiments, in the mode switching signal SMODE indicating switching from the first mode to the second mode, the panel driver 120 (or the controller 160) may gradually change an on-period ratio of at least one of the first global signal GS1 and the second global signal GS2 over a plurality of frame periods. Here, the on-period ratio of the first global signal GS1 may represent a ratio of a time length of an on-period (e.g., a period during which signal level is low) of the first global signal GS1 to a time length of each frame period, and the on-period ratio of the second global signal GS2 may represent a ratio of a time length of an on-period of the second global signal GS2 to the time length of each frame period. For example, as illustrated in FIG. 6, when the mode switching signal SMODE indicates switching from the public mode to the private mode, the panel driver 120 (or the controller 160) may gradually decrease the on-period ratio of the first global signal GS1 over a plurality of frame periods FP1, FP2, . . . , FPN. That is, in the example of FIG. 6, the first global signal GS1 may have a first on-period OP1_1 that is shorter than the frame period FP1 in the first frame period FP1, and may have a second on-period OP1_2 that is shorter than the first on-period OP1_1 in a second frame period FP2. Further, on-periods OP1_N of the first global signal GS1 may gradually decrease in third through N-th frame periods FPN. Further, the panel driver 120 (or the controller 160) may gradually increase the on-period ratio of the second global signal GS2 over the plurality of frame periods FP1, FP2, . . . , FPN. That is, in the example of FIG. 6, the second global signal GS2 may have a first on-period OP2_1 in the first frame period FP1, and may have a second on-period OP2_2 longer than the first on-period OP2_1 in the second frame period FP2. Further, on-periods OP2_N of the second global signal GS2 may gradually increase in the third through N-th frame periods FPN. In this case, since the on-periods OP1_1, OP1_2, . . . , OP1_N of the first global signal GS1 are gradually decreased in the plurality of frame periods FP1, FP2, . . . , FPN, time periods in which the first light emitting elements EL1 of the plurality of pixels PX emit light may be gradually decreased in the plurality of frame periods FP1, FP2, . . . , FPN. Further, since the on-periods OP2_1, OP2_2, . . . , OP2_N of the second global signal GS2 gradually be increased in the plurality of frame periods FP1, FP2, . . . , FPN, time period in which the second light emitting elements EL2 of the plurality of pixels PX emit light may be gradually increased in the plurality of frame periods FP1, FP2, . . . , FPN. Further, since each of the first and second global signals GS1 and GS2 has the on-level (e.g., the low level) or the off-level (e.g., the high level) in the plurality of frame periods FP1, FP2, . . . , FPN, the Mura defect due to the threshold voltage distribution of the first and second transistors T1 and T2 of the plurality of pixels PX may not occur in the display device 100 according to embodiments. That is, the display device 100 according to embodiments may perform smooth mode switching without the Mura defect due to the threshold voltage distribution.

Although FIG. 6 illustrates an example in which a falling edge of the second global signal GS2 lags a rising edge of the first global signal GS1 by a predetermined time in each frame period (e.g., the first frame period FP1) so that the on-period OP1_1 of the first global signal GS1 does not overlap the on-period OP2_1 of the second global signal GS2, the first and second global signals GS1 and GS2 are not limited to the example of FIG. 6. In other embodiments, the first global signal GS1 may have the rising edge and the second global signal GS2 may have the falling edge at substantially the same time point. In still other embodiments, in each frame period (e.g., the first frame period FP1), the falling edge of the second global signal GS2 may lead the rising edge of the first global signal GS1 by a predetermined time such that the on-period OP1_1 of the first global signal GS1 partially overlap the on-period OP2_1 of the second global signal GS2.

As described above, in the display device 100 according to embodiments, at least one pixel PX may include the first and second light emitting elements EL1 and EL2 having different viewing angles, and the panel driver 120 may gradually change the on-period ratio of at least one of the first signal (or the first global signal GS1) for providing the driving current IDR to the first light emitting element EL1 and the second signal (or the second global signal GS2) for providing the driving current IDR to the second light emitting element EL2 over the plurality of frame periods FP1, FP2, . . . , FPN in response to the mode switching signal SMODE. Accordingly, the display device 100 according to embodiments may perform the smooth mode switching without the Mura defect due to the threshold voltage distribution.

Figure 7:
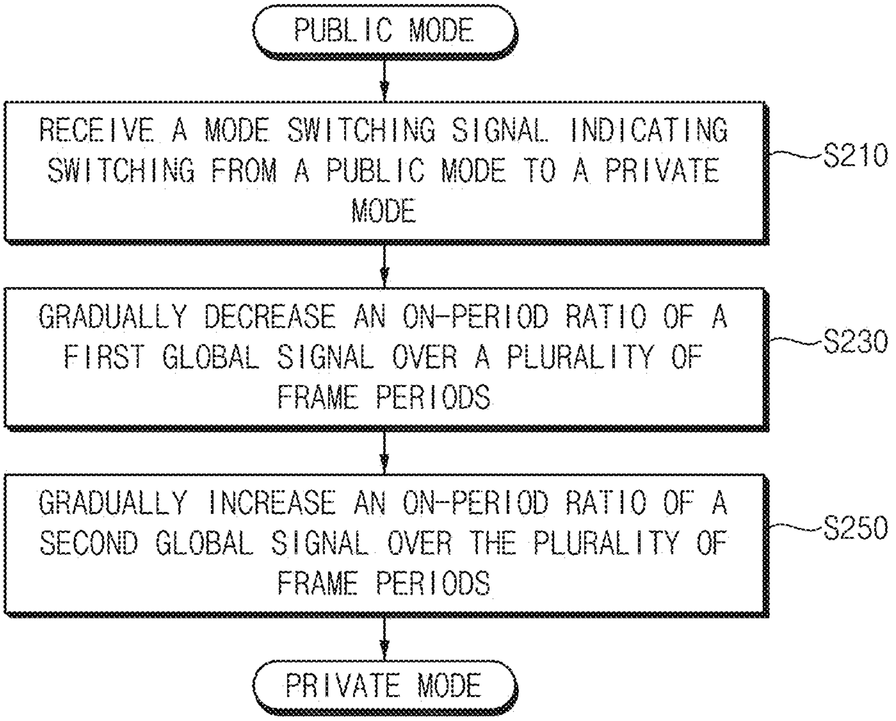
FIG. 7 is a flowchart illustrating a method of operating a display device in a case where a mode of the display device is switched from a public mode to a private mode according to embodiments.

FIG. 7 is a flowchart illustrating a method of operating a display device in a case where a mode of the display device is switched from a public mode to a private mode according to embodiments.

Referring to FIGS. 1 and 7, a panel driver 120 of a display device 100 operating in a public mode may receive a mode switching signal SMODE indicating switching from the public mode to a private mode (S210). In some embodiments, the display device 100 may be a vehicle display device mounted in a vehicle, and the panel driver 120 may receive the mode switching signal SMODE indicating switching from the public mode to the private mode when the vehicle changes from a stationary state to a moving state.

In response to the mode switching signal SMODE indicating switching from the public mode to the private mode, as illustrated in FIG. 6, over a plurality of frame periods FP1, FP2, . . . , FPN, the panel driver 120 may gradually decrease an on-period ratio of a first global signal GS1 (S230), and may gradually increase an on-period ratio of a second global signal GS2 (S250). That is, as illustrated in FIG. 6, on-periods OP1_1, OP1_2, . . . , OP1_N of the first global signal GS1 may gradually decrease in the plurality of frame periods FP1, FP2, . . . , FPN, and on-periods OP2_1, OP2_2, . . . , OP2_N of the second global signal GS2 may gradually increase in the plurality of frame periods FP1, FP2, . . . , FPN. Accordingly, the display device 100 may perform smooth mode switching from the public mode to the private mode without a Mura defect due to a threshold voltage distribution of a plurality of pixels PX.

Figure 8:
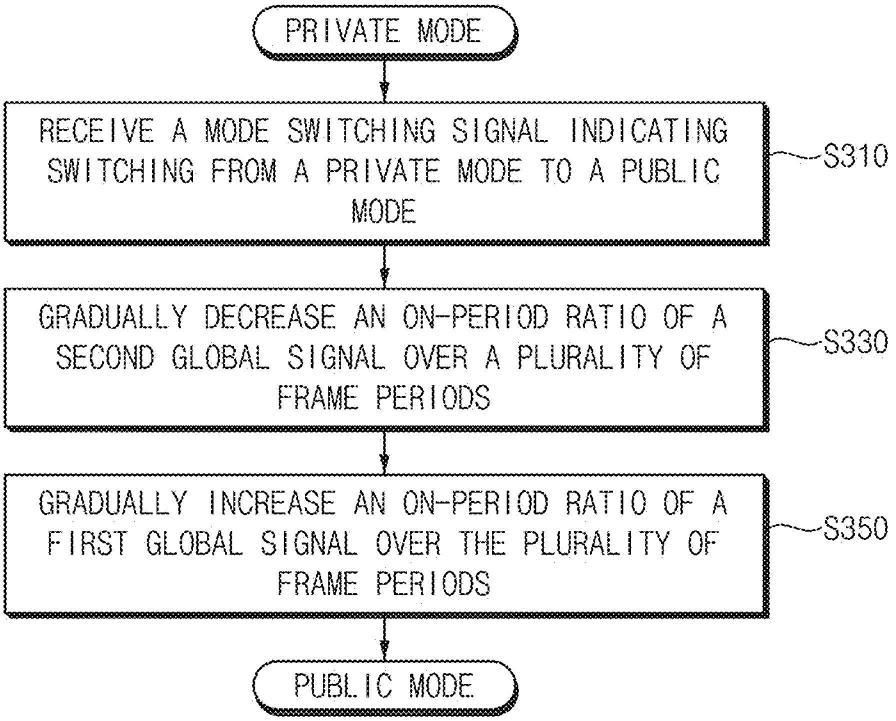
FIG. 8 is a flowchart illustrating a method of operating a display device in a case where a mode of the display device is switched from a private mode to a public mode according to embodiments.
Figure 9:
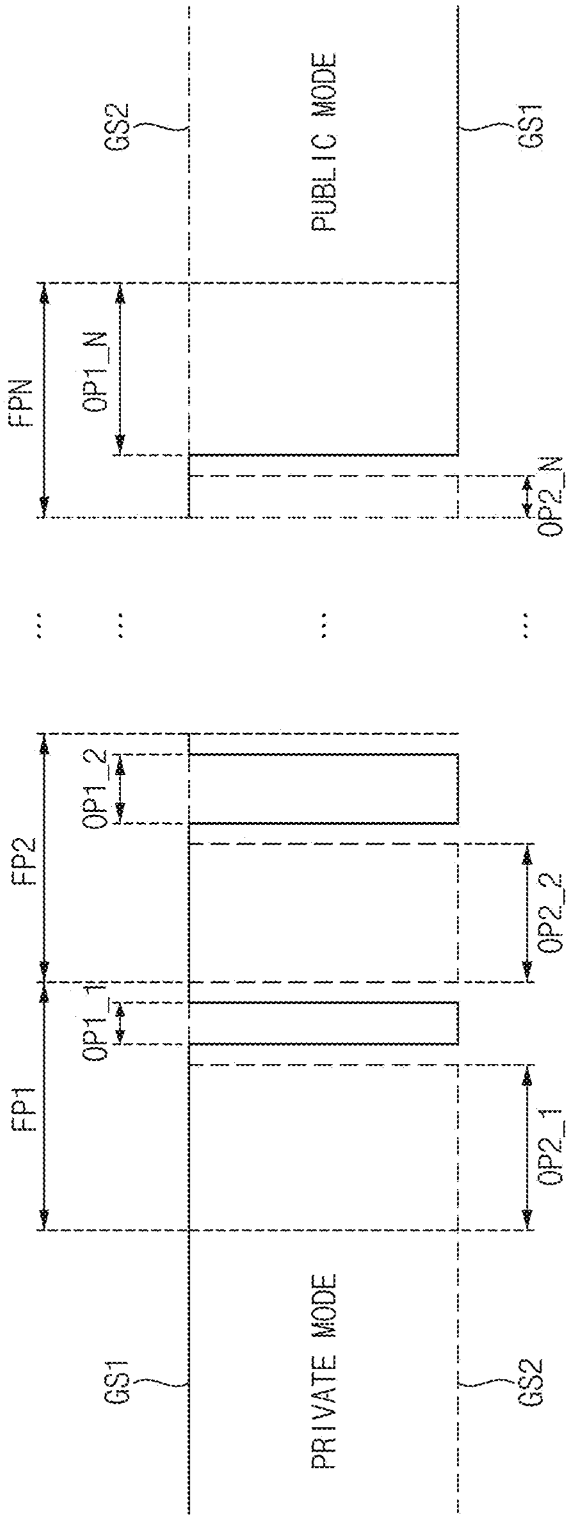
FIG. 9 is a timing diagram illustrating a first global signal and a second global signal in a case where a mode of a display device is switched from a private mode to a public mode.

FIG. 8 is a flowchart illustrating a method of operating a display device in a case where a mode of the display device is switched from a private mode to a public mode according to embodiments, and FIG. 9 is a timing diagram illustrating a first global signal and a second global signal in a case where a mode of a display device is switched from a private mode to a public mode.

Referring to FIGS. 1 and 8, a panel driver 120 of a display device 100 operating in a private mode may receive a mode switching signal SMODE indicating switching from the private mode to a public mode (S310). In some embodiments, the display device 100 may be a vehicle display device mounted in a vehicle, and the panel driver 120 may receive the mode switching signal SMODE indicating switching from the private mode to the public mode when the vehicle changes from a moving state to a stationary state.

In response to the mode switching signal SMODE indicating switching from the private mode to the public mode, as illustrated in FIG. 9, over a plurality of frame periods FP1, FP2, . . . , FPN, the panel driver 120 may gradually decrease an on-period ratio of a second global signal GS2 (S330), and may gradually increase an on-period ratio of a first global signal GS1 (S350). That is, as illustrated in FIG. 9, on-periods OP2_1, OP2_2, . . . , OP2_N of the second global signal GS2 may gradually decrease in the plurality of frame periods FP1, FP2, . . . , FPN, and on-periods OP1_1, OP1_2, . . . , OP1_N of the first global signal GS1 may gradually increase in the plurality of frame periods FP1, FP2, . . . , FPN. Accordingly, the display device 100 may perform smooth mode switching from the private mode to the public mode without a Mura defect due to a threshold voltage distribution of a plurality of pixels PX.

Figure 10:
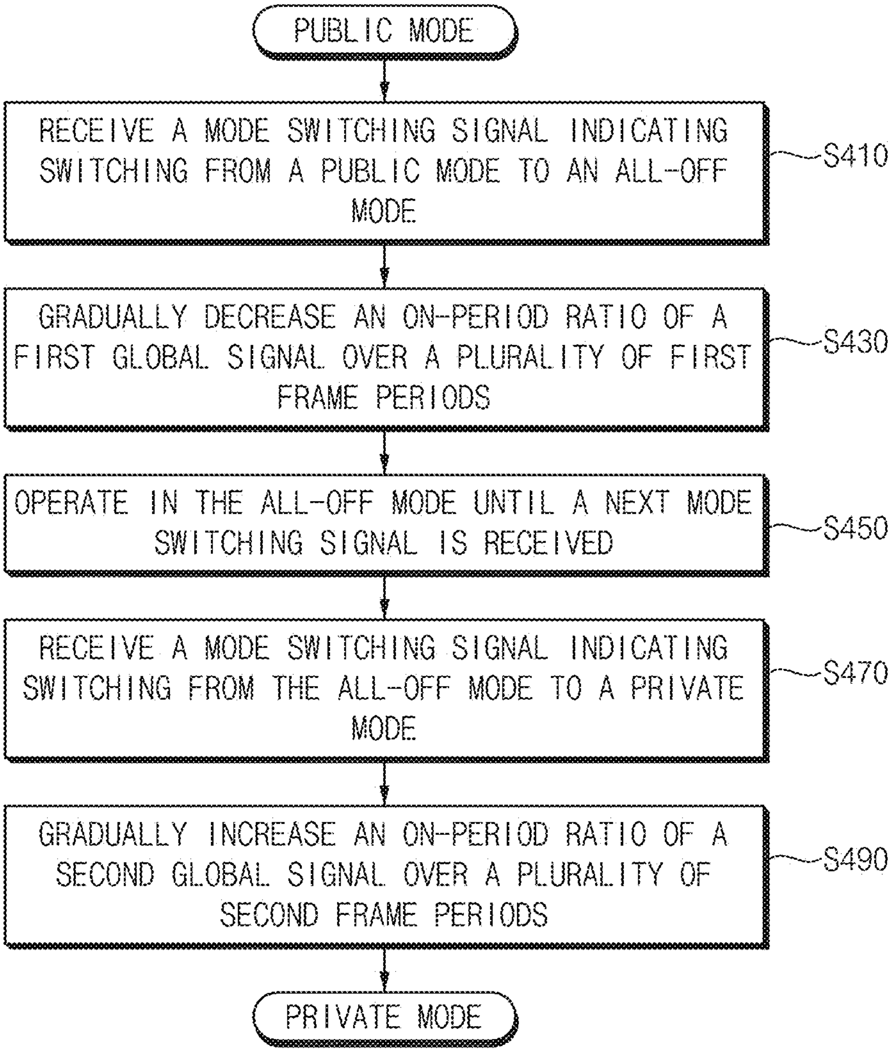
FIG. 10 is a flowchart illustrating a method of operating a display device in a case where a mode of the display device is switched from a public mode to a private mode according to embodiments.
Figure 11:
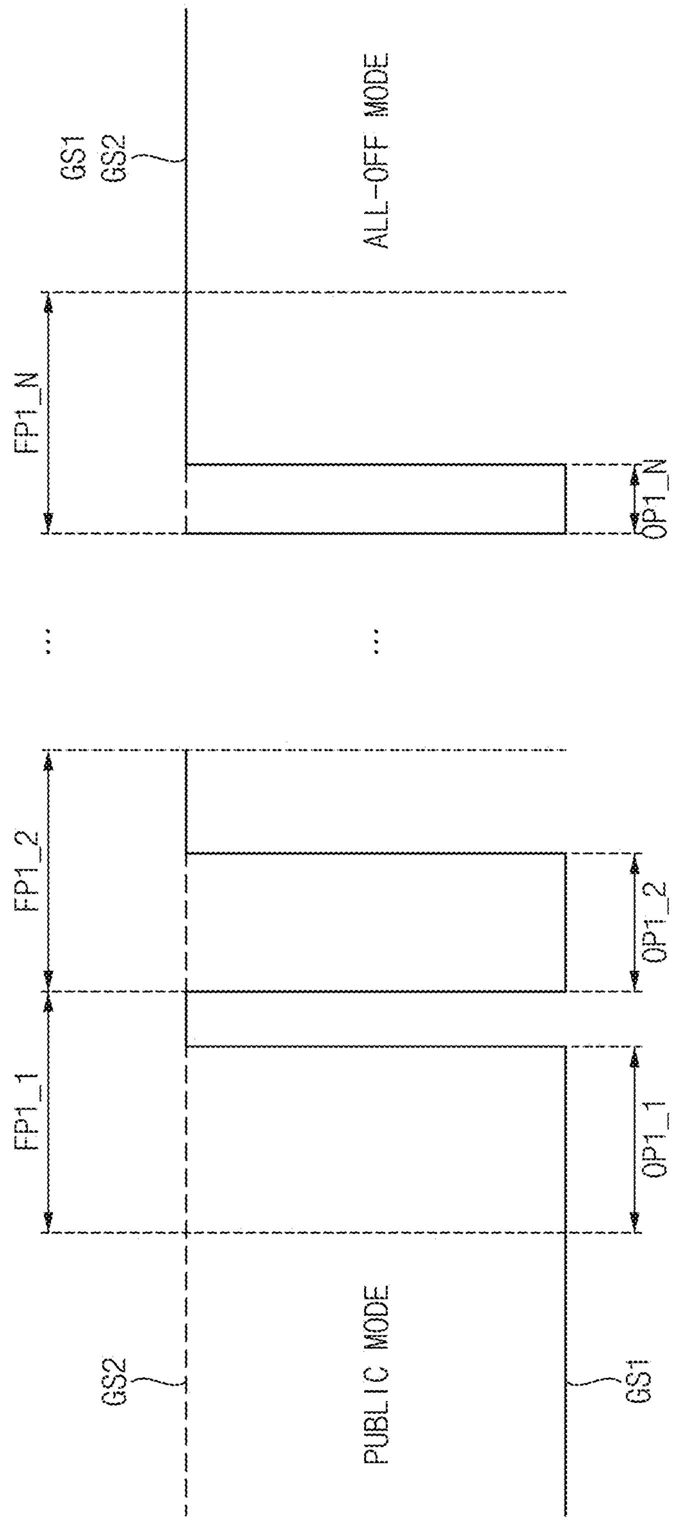
FIG. 11 is a timing diagram illustrating a first global signal and a second global signal in a case where a mode of a display device is switched from a public mode to an all-off mode.
Figure 12:
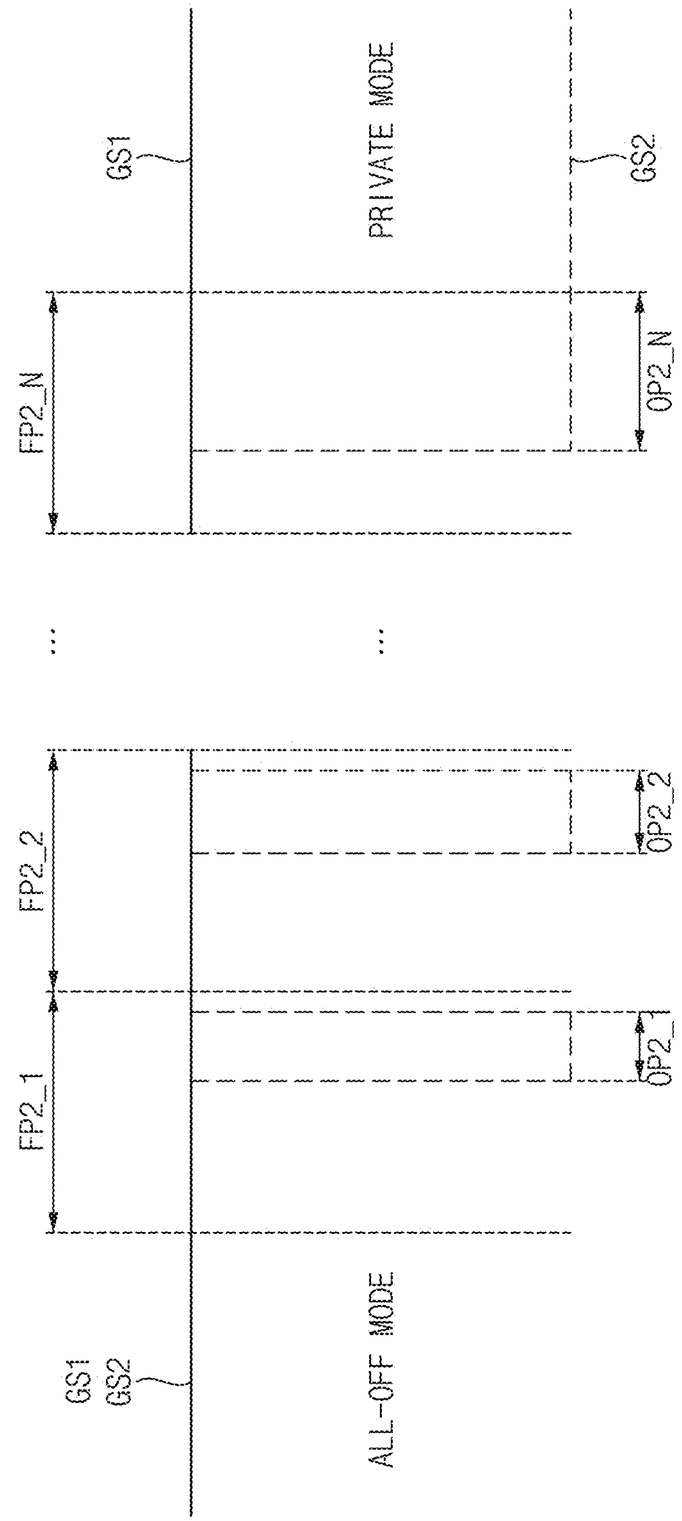
FIG. 12 is a timing diagram illustrating a first global signal and a second global signal in a case where a mode of a display device is switched from an all-off mode to a private mode.

FIG. 10 is a flowchart illustrating a method of operating a display device in a case where a mode of the display device is switched from a public mode to a private mode according to embodiments, FIG. 11 is a timing diagram illustrating a first global signal and a second global signal in a case where a mode of a display device is switched from a public mode to an all-off mode, and FIG. 12 is a timing diagram illustrating a first global signal and a second global signal in a case where a mode of a display device is switched from an all-off mode to a private mode.

Referring to FIGS. 1 and 10, a panel driver 120 of a display device 100 operating in a public mode may receive a mode switching signal SMODE indicating switching from the public mode to an all-off mode (S410). In some embodiments, the display device 100 may be a vehicle display device mounted in a vehicle, and the panel driver 120 may receive the mode switching signal SMODE indicating switching from the public mode to the all-off mode when the vehicle changes from a stationary state to a moving state or when an engine of the vehicle is turned off.

In response to the mode switching signal SMODE indicating switching from the public mode to the all-off mode, as illustrated in FIG. 11, the panel driver 120 may gradually decrease an on-period ratio of a first global signal GS1 over a plurality of first frame periods FP1_1, FP1_2, . . . , FP1_N (S430). That is, as illustrated in FIG. 11, on-periods OP1_1, OP1_2, . . . , OP1_N of the first global signal GS1 may gradually decrease in the plurality of first frame periods FP1_1, FP1_2, . . . , FP1_N. Thus, luminance of an image viewed by first and second users located on the front and side of the display device 100 may gradually decrease, and this operation may be referred to as a "fade-out operation."

In some embodiments, when the engine of the vehicle is turned off, the panel driver 120 may perform the fade-out operation, and the display device 100 may be powered off.

In other embodiments, the display device 100 may operate in the all-off mode until a next mode switching signal SMODE is received (S450). In the all-off mode, the display device 100 may not display an image. Further, the panel driver 120 of the display device 100 operating in the all-off mode may receive the mode switching signal SMODE indicating switching from the all-off mode to the private mode (S470). In response to the mode switching signal SMODE indicating switching from the all-off mode to the private mode, as illustrated in FIG. 12, the panel driver 120 may gradually increase an on-period ratio of a second global signal GS2 over a plurality of second frame periods FP2_1, FP2_2, . . . , FP2_N (S490). That is, as illustrated in FIG. 12, on-periods OP2_1, OP2_2, . . . , OP2_N of the second global signal GS2 may gradually increase in the plurality of second frame periods FP2_1, FP2_2, . . . , FP2_N. Thus, luminance of an image viewed by the first user located in the front of the display device 100 may gradually increase, and this operation may be referred to as a "fade-in operation." Accordingly, the display device 100 may perform smooth mode switching from the public mode to the all-off mode and/or smooth mode switching from the all-off mode to the private mode without a Mura defect due to a threshold voltage distribution of a plurality of pixels PX.

Figure 13:
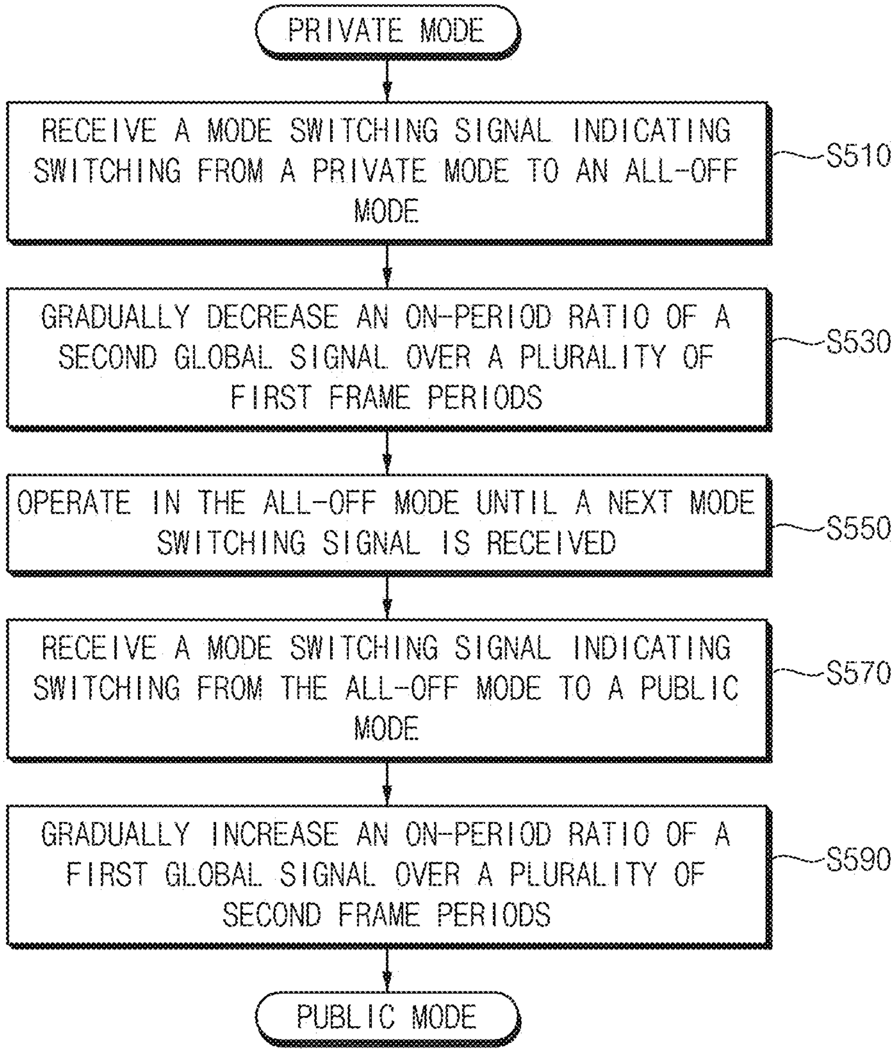
FIG. 13 is a flowchart illustrating a method of operating a display device in a case where a mode of the display device is switched from a private mode to a public mode according to embodiments.
Figure 14:
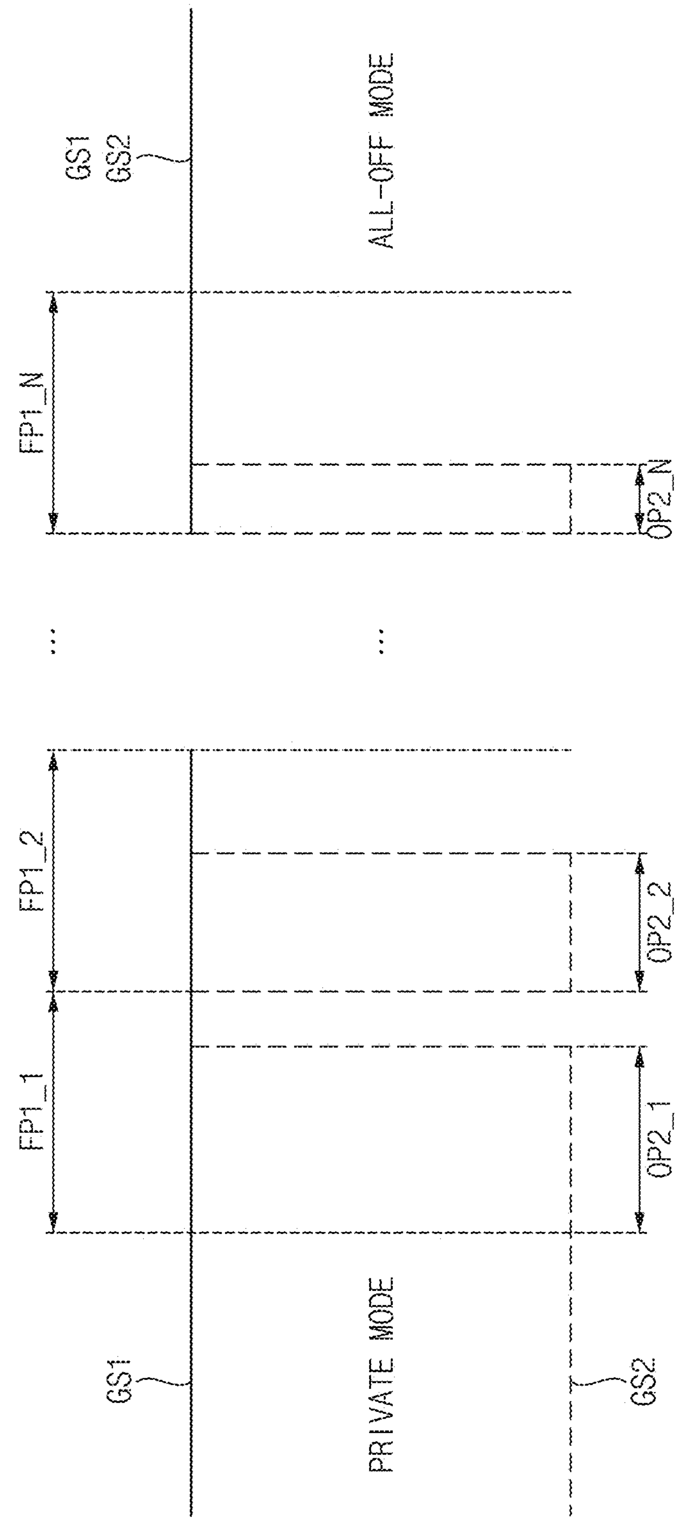
FIG. 14 is a timing diagram illustrating a first global signal and a second global signal in a case where a mode of a display device is switched from a private mode to an all-off mode.
Figure 15:
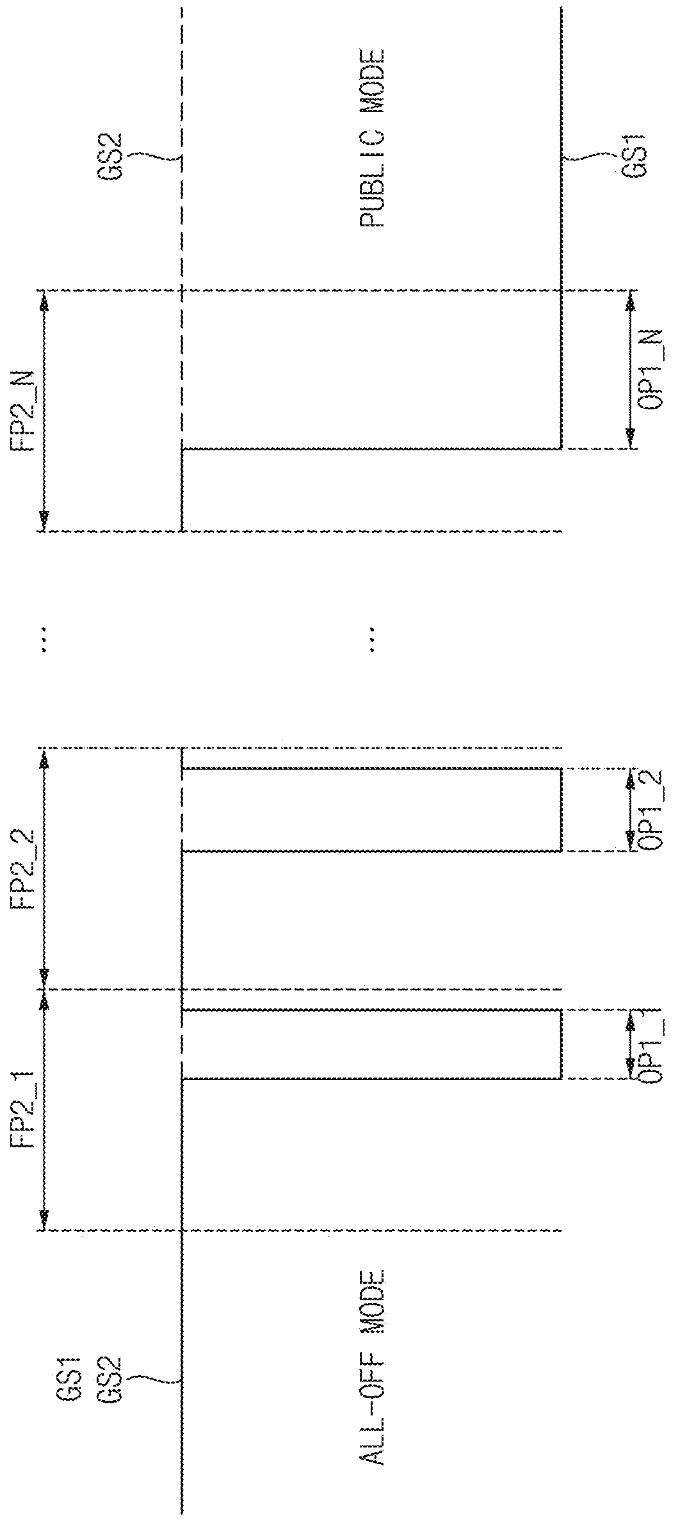
FIG. 15 is a timing diagram illustrating a first global signal and a second global signal in a case where a mode of a display device is switched from an all-off mode to a public mode.

FIG. 13 is a flowchart illustrating a method of operating a display device in a case where a mode of the display device is switched from a private mode to a public mode according to embodiments, FIG. 14 is a timing diagram illustrating a first global signal and a second global signal in a case where a mode of a display device is switched from a private mode to an all-off mode, and FIG. 15 is a timing diagram illustrating a first global signal and a second global signal in a case where a mode of a display device is switched from an all-off mode to a public mode.

Referring to FIGS. 1 and 13, a panel driver 120 of a display device 100 operating in a private mode may receive a mode switching signal SMODE indicating switching from the private mode to an all-off mode (S510). In some embodiments, the display device 100 may be a vehicle display device mounted in a vehicle, and the panel driver 120 may receive the mode switching signal SMODE indicating switching from the private mode to the all-off mode when the vehicle changes from a moving state to a stationary state.

In response to the mode switching signal SMODE indicating switching from the private mode to the all-off mode, as illustrated in FIG. 14, the panel driver 120 may gradually decrease an on-period ratio of a second global signal GS2 over a plurality of first frame periods FP1_1, FP1_2, . . . , FP1_N (S530). That is, as illustrated in FIG. 14, on-periods OP2_1, OP2_2, . . . , OP2_N of the second global signal GS2 may gradually decrease in the plurality of first frame periods FP1_1, FP1_2, . . . , FP1_N. Thus, luminance of an image viewed by a first user located in the front of the display device 100 may gradually decrease, and this operation may be referred to as a "fade-out operation."

The display device 100 may operate in the all-off mode until a next mode switching signal SMODE is received (S550). In the all-off mode, the display device 100 may not display an image. Further, the panel driver 120 of the display device 100 operating in the all-off mode may receive the mode switching signal SMODE indicating switching from the all-off mode to a public mode (S570). In response to the mode switching signal SMODE indicating switching from the all-off mode to the public mode, as illustrated in FIG. 15, the panel driver 120 may gradually increase an on-period ratio of a first global signal GS1 over a plurality of second frame periods FP2_1, FP2_2, . . . , FP2_N (S590). That is, as illustrated in FIG. 15, on-periods OP1_1, OP1_2, . . . , OP1_N of the first global signal GS1 may gradually increase in the plurality of second frame periods FP2_1, FP2_2, . . . , FP2_N. Thus, luminance of an image viewed by the first and second users located on the front and side of the display device 100 may gradually increase, and this operation may be referred to as a "fade-in operation." Accordingly, the display device 100 may perform smooth mode switching from the private mode to the all-off mode and/or smooth mode switching from the all-off mode to the public mode without a Mura defect due to a threshold voltage distribution of a plurality of pixels PX.

Figure 16:
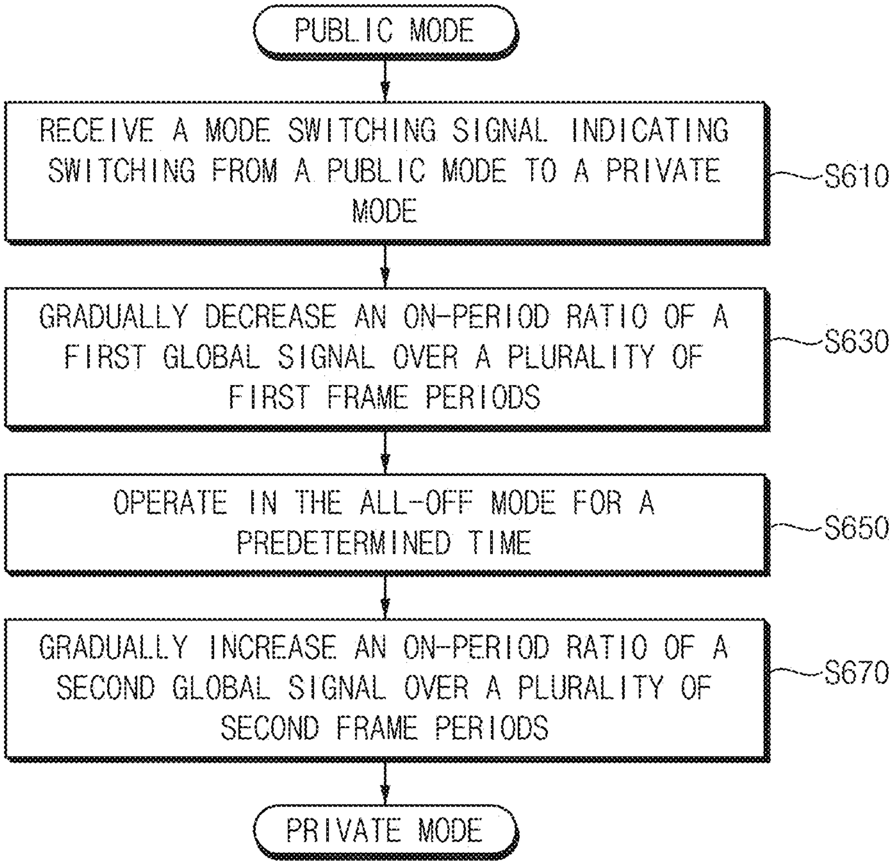
FIG. 16 is a flowchart illustrating a method of operating a display device in a case where a mode of the display device is switched from a public mode to a private mode according to embodiments.

FIG. 16 is a flowchart illustrating a method of operating a display device in a case where a mode of the display device is switched from a public mode to a private mode according to embodiments.

Referring to FIGS. 1 and 16, a panel driver 120 of a display device 100 operating in a public mode may receive a mode switching signal SMODE indicating switching from the public mode to a private mode (S610). In response to the mode switching signal SMODE indicating switching from the public mode to the private mode, the panel driver 120 may perform a fade-out operation that gradually decreases an on-period ratio of a first global signal GS1 over a plurality of first frame periods (S630). Accordingly, a mode of the display device 100 may gradually change from the public mode to an all-off mode.

The display device 100 may operate in the all-off mode for a predetermined time (S650), and after the predetermined time, the panel driver 120 may perform a fade-in operation that gradually increases an on-period ratio of a second global signal GS2 over a plurality of second frame periods (S670). Accordingly, the display device 100 may perform smooth mode switching from the public mode to the all-off mode and/or smooth mode switching from the all-off mode to the private mode without a Mura defect due to a threshold voltage distribution of a plurality of pixels PX.

Figure 17:
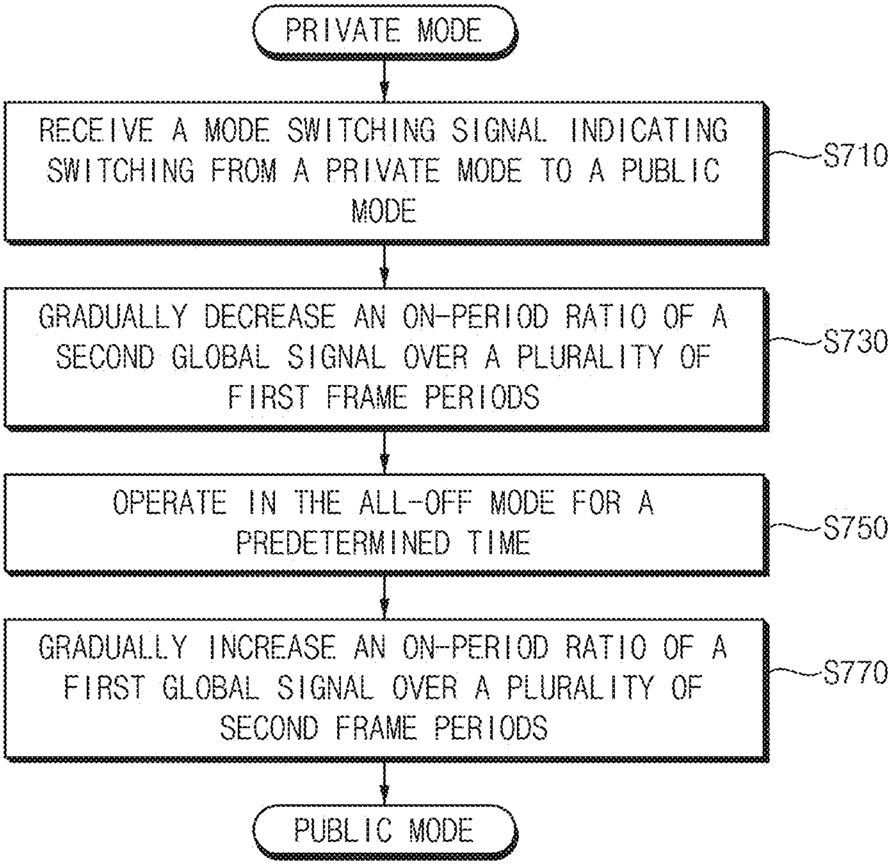
FIG. 17 is a flowchart illustrating a method of operating a display device in a case where a mode of the display device is switched from a private mode to a public mode according to embodiments.

FIG. 17 is a flowchart illustrating a method of operating a display device in a case where a mode of the display device is switched from a private mode to a public mode according to embodiments.

Referring to FIGS. 1 and 17, a panel driver 120 of a display device 100 operating in a private mode may receive a mode switching signal SMODE indicating switching from the private mode to a public mode (S710). In response to the mode switching signal SMODE indicating switching from the private mode to the public mode, the panel driver 120 may perform a fade-out operation that gradually decreases an on-period ratio of a second global signal GS2 over a plurality of first frame periods (S730). Accordingly, a mode of the display device 100 may gradually change from the private mode to an all-off mode.

The display device 100 may operate in the all-off mode for a predetermined time (S750), and after the predetermined time, the panel driver 120 may perform a fade-in operation that gradually increases an on-period ratio of a first global signal GS1 over a plurality of second frame periods (S790). Accordingly, the display device 100 may perform smooth mode switching from the private mode to the all-off mode and/or smooth mode switching from the all-off mode to the public mode without a Mura defect due to a threshold voltage distribution of a plurality of pixels PX.

Figure 18:
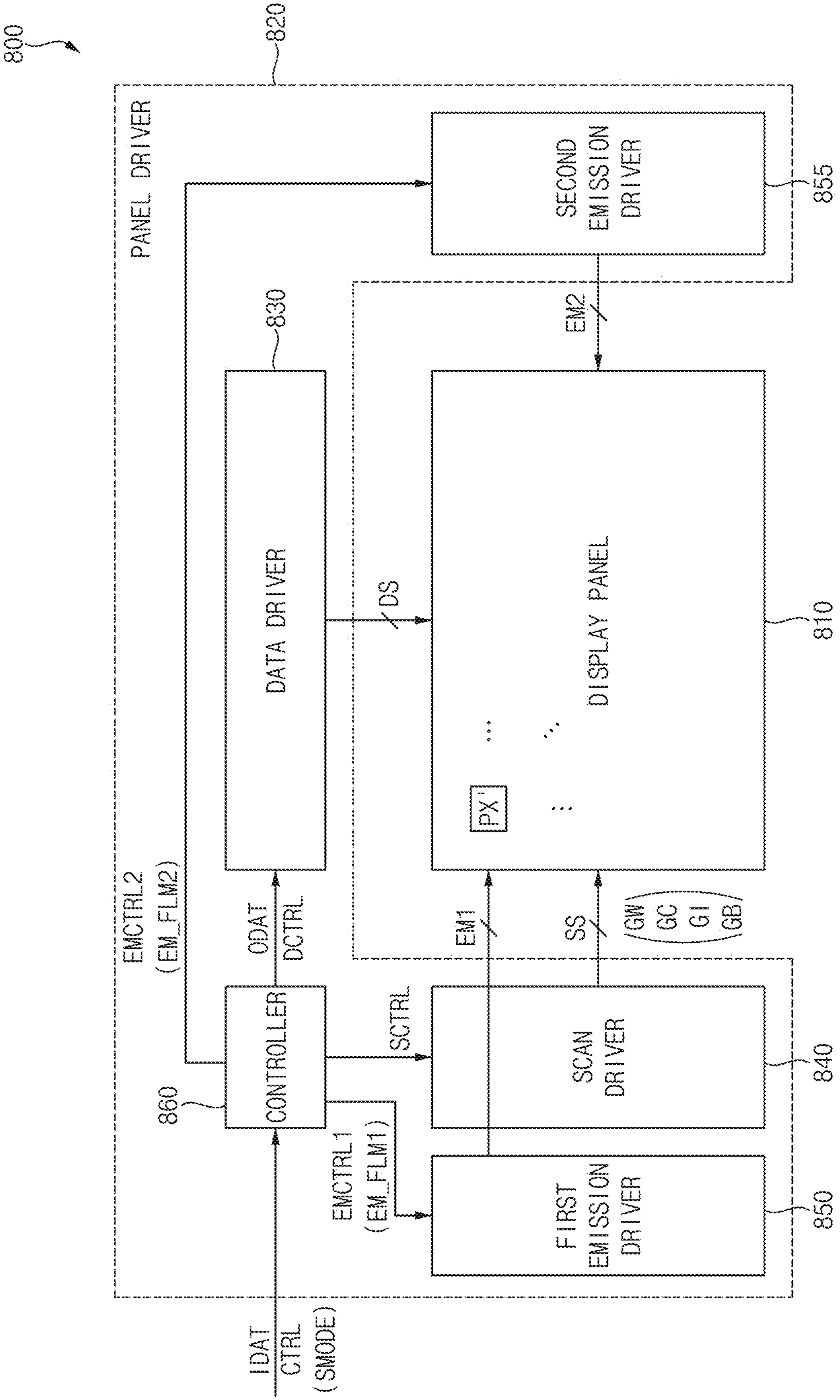
FIG. 18 is a block diagram illustrating a display device according to embodiments.
Figure 19:
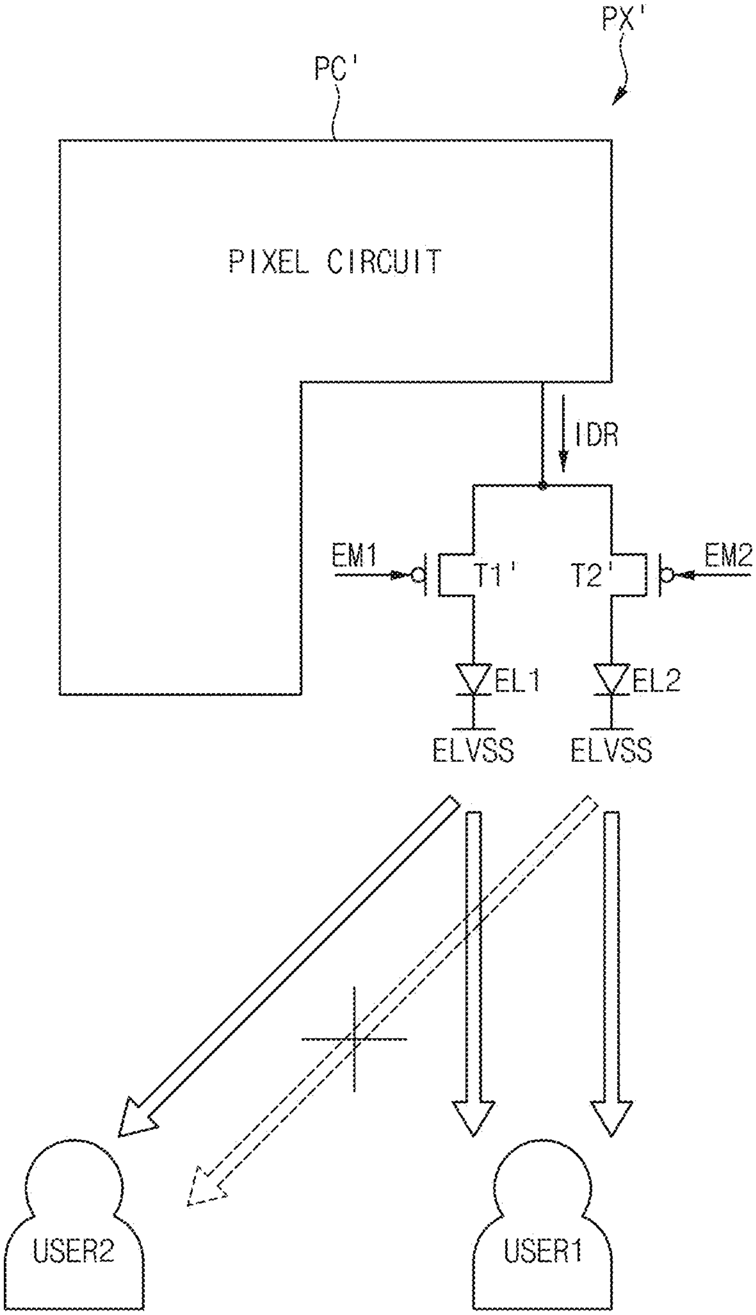
FIG. 19 is a diagram illustrating at least one pixel included in a display device according to embodiments.
Figure 20:
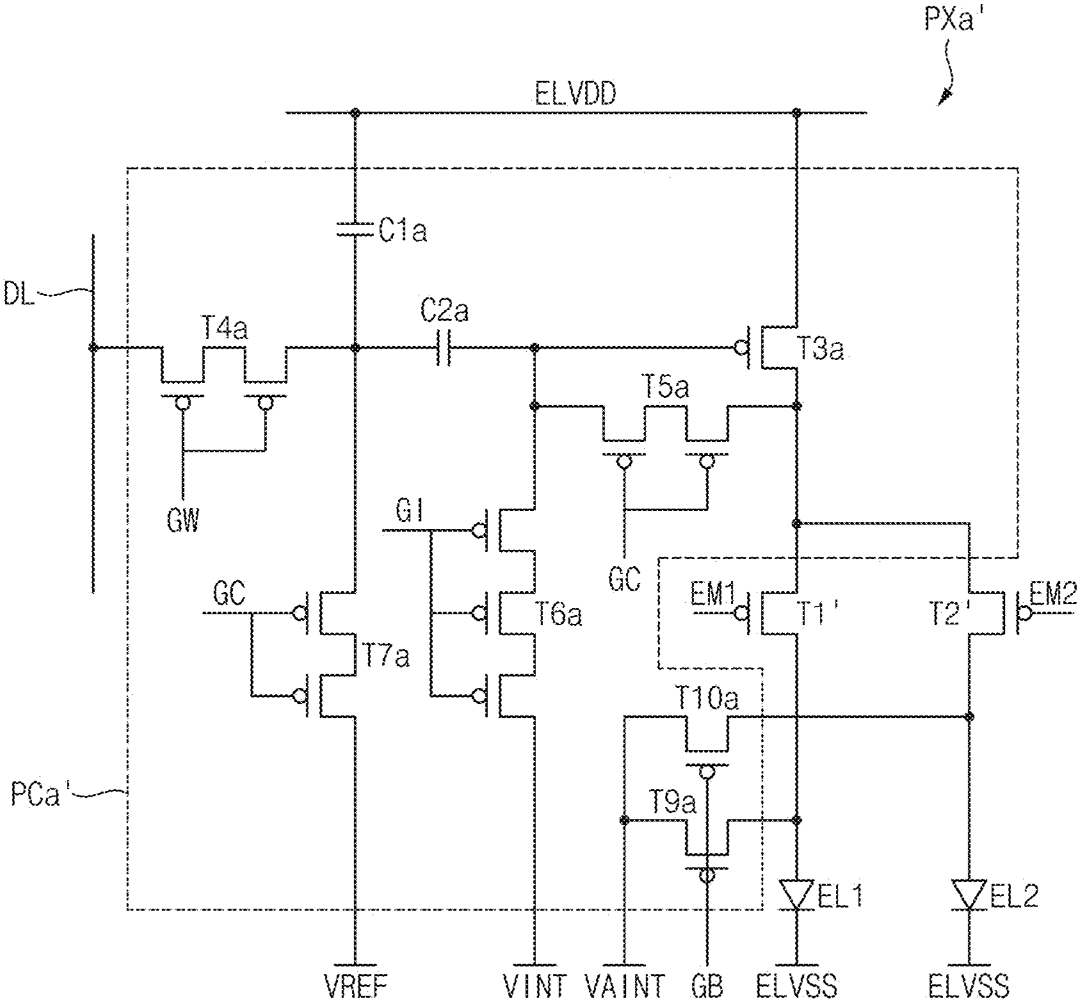
FIG. 20 is a circuit diagram illustrating an example of at least one pixel included in a display device according to embodiments.
Figure 21:
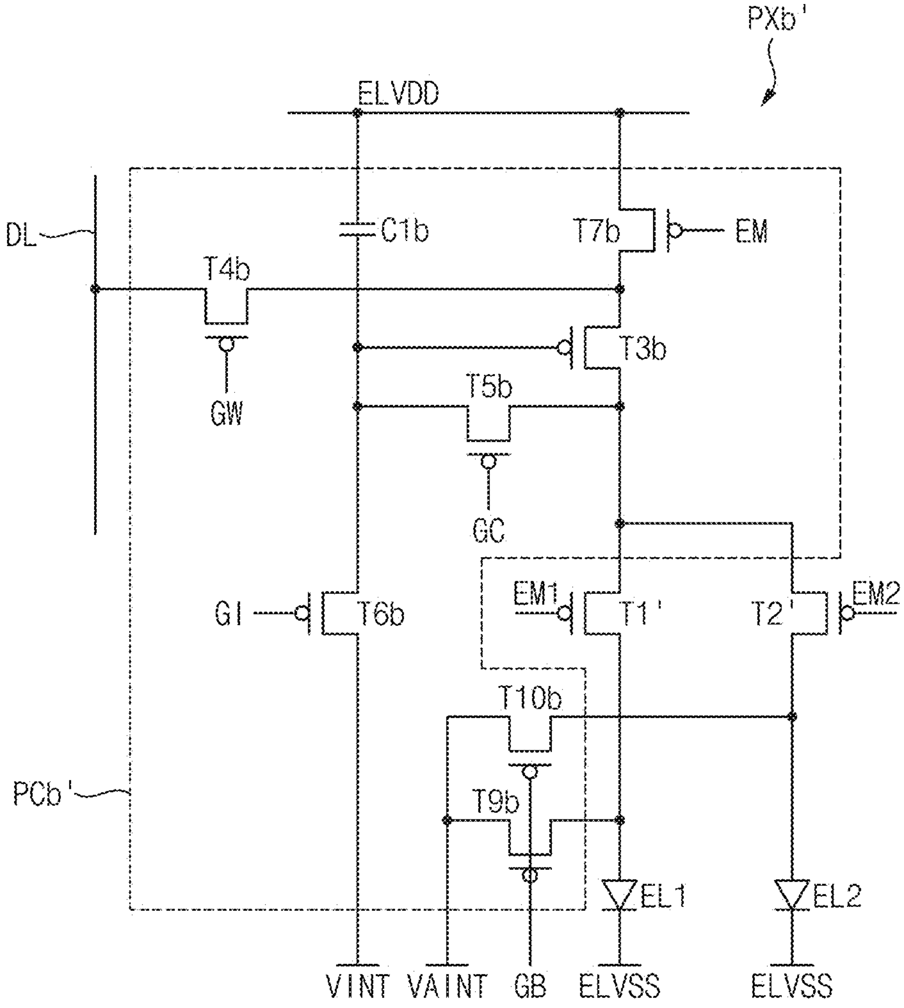
FIG. 21 is a circuit diagram illustrating another example of at least one pixel included in a display device according to embodiments.
Figure 22:
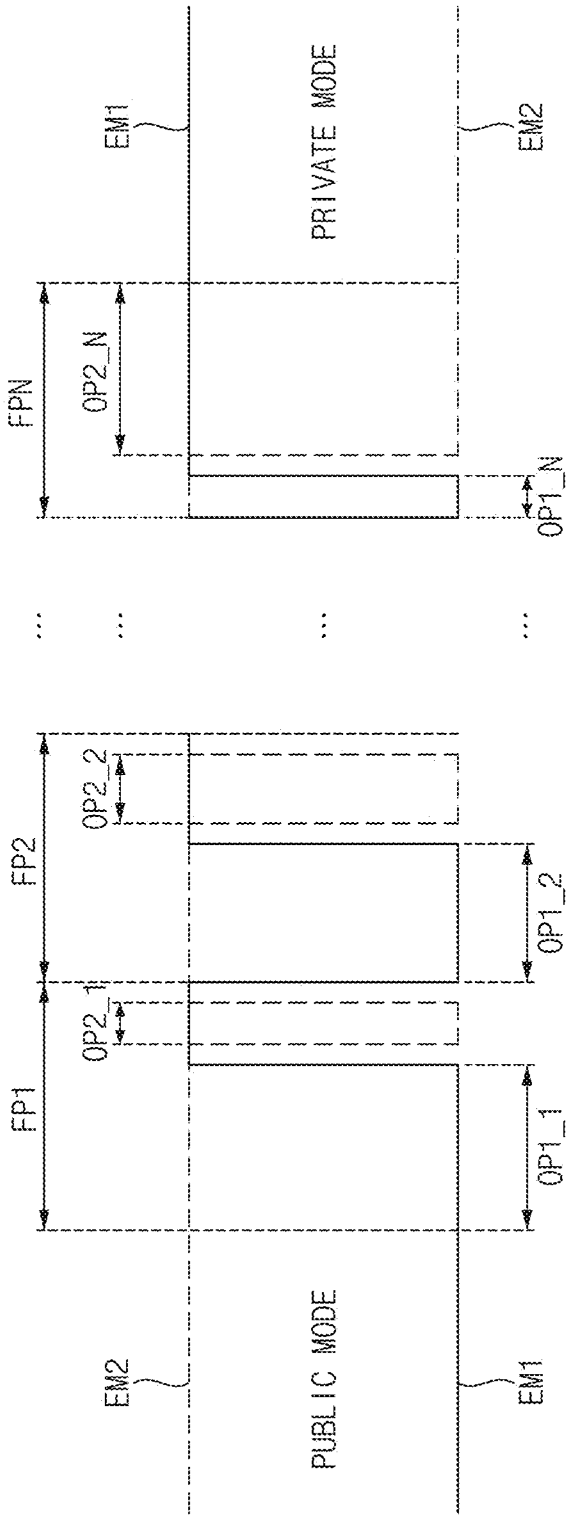
FIG. 22 is a timing diagram illustrating a first emission signal and a second emission signal in a case where a mode of a display device is switched from a public mode to a private mode according to embodiments.
Figure 23:
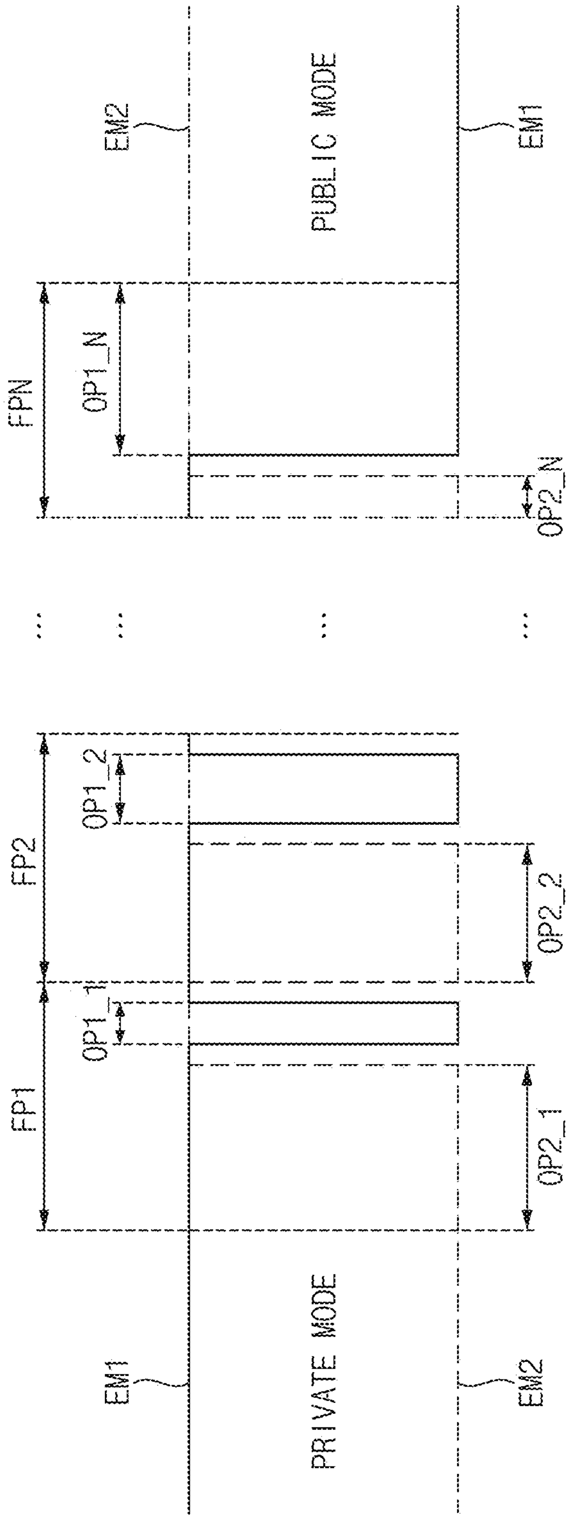
FIG. 23 is a timing diagram illustrating a first emission signal and a second emission signal in a case where a mode of a display device is switched from a private mode to a public mode according to embodiments.

FIG. 18 is a block diagram illustrating a display device according to embodiments, FIG. 19 is a diagram illustrating at least one pixel included in a display device according to embodiments, FIG. 20 is a circuit diagram illustrating an example of at least one pixel included in a display device according to embodiments, FIG. 21 is a circuit diagram illustrating another example of at least one pixel included in a display device according to embodiments, FIG. 22 is a timing diagram illustrating a first emission signal and a second emission signal in a case where a mode of a display device is switched from a public mode to a private mode according to embodiments, and FIG. 23 is a timing diagram illustrating a first emission signal and a second emission signal in a case where a mode of a display device is switched from a private mode to a public mode according to embodiments.

Referring to FIG. 18, a display device 800 according to embodiments may include a display panel 810 and a panel driver 820. The panel driver 820 may include a data driver 830, a scan driver 840, a first emission driver 850 that sequentially provides first emission signals EM1 to a plurality of pixels PX' on a row basis, a second emission driver 855 that sequentially provides second emission signals EM2 to the plurality of pixels PX' on a row basis, and a controller 860. The display device 800 of FIG. 18 may have a similar configuration and a similar operation to a display device 100 of FIG. 1, except that the panel driver 820 may include the first and second emission drivers 850 and 855 (instead of an emission driver 150 illustrated in FIG. 1 or along with the emission driver 150), that the controller 860 may not provide first and second global signals GS1 and GS2 illustrated in FIG. 1 to the plurality of pixels PX', and that the first and second emission drivers 850 and 855 may provide the first and second emission signals EM1 and EM2 to the plurality of pixels PX'.

As illustrated in FIG. 19, at least one pixel PX' of the display panel 810 may include a first light emitting element EL1, a second light emitting element EL2, a pixel circuit PC', a first transistor T1' and a second transistor T2'.

In some embodiments, as illustrated in FIG. 20, a pixel PXa' may include a first light emitting element EL1, a second light emitting element EL2, a first transistor T1', a second transistor T2' and a pixel circuit PCa', and the pixel circuit PCa' may include a third transistor T3*a*, a fourth transistor T4*a*, a first capacitor C1*a*, a second capacitor C2*a*, a fifth transistor T5*a*, sixth transistor T6*a*, a seventh transistor T7*a*, a ninth transistor T9*a* and a tenth transistor T10*a*. The pixel circuit PCa' illustrated in FIG. 20 may have a similar configuration and a similar operation to a pixel circuit PCa illustrated in FIG. 3, except that the pixel circuit PCa' may not include an eighth transistor T8*a* illustrated in FIG. 3.

In other embodiments, as illustrated in FIG. 21, a pixel PXb' may include a first light emitting element EL1, a second light emitting element EL2, a first transistor T1', a second transistor T2' and a pixel circuit PCb', and the pixel circuit PCb' may include a third transistor T3*b*, a fourth transistor T4*b*, a fifth transistor T5*b*, a first capacitor C1*b*, a sixth transistor T6*b*, a seventh transistor T7*b*, a ninth transistor T9*b* and a tenth transistor T10*b*. The pixel circuit PCb' illustrated in FIG. 21 may have a similar configuration and a similar operation to a pixel circuit PCb illustrated in FIG. 4, except that the pixel circuit PCb' may not include an eighth transistor T8*b* illustrated in FIG. 4.

The first transistor T1' may provide a driving current IDR to the first light emitting element EL1 in response to a first signal, and the second transistor T2' may provide a driving current IDR to the second light emitting element EL2 in response to a second signal. In some embodiments, the first signal may be a first emission signal EM1 that sequentially applied to the plurality of pixels PX' on a row basis, and the second signal may be a second emission signal EM2 that is sequentially applied to the plurality of pixels PX' on a row basis.

In some embodiments, the pixel PX' may be the pixel PXa' illustrated in FIG. 20, the first transistor T1' may include a gate connected to a first emission signal line which transfers the first emission signal EM1, a first terminal connected to a second terminal of the third transistor T3*a*, and a second terminal connected to the first light emitting element EL1, and the second transistor T2' may include a gate connected to a second emission signal line which transfers the second emission signal EM2, a first terminal connected to the second terminal of the third transistor T3*a*, and a second terminal connected to the second light emitting element EL2.

In other embodiments, the pixel PX' may be the pixel PXb' illustrated in FIG. 21, the first transistor T1' may include a gate connected to the first emission signal line, a first terminal connected to a second terminal of the third transistor T3*b*, and a second terminal connected to the first light emitting element EL1, and the second transistor T2' may include a gate connected to the second emission signal line, a first terminal connected to the second terminal of the third transistor T3*b*, and a second terminal connected to the second light emitting element EL2.

The first emission driver 850 may generate the first emission signals EM1 based on a first emission control signal EMCTRL1 received from the controller 860, and may sequentially provide the first emission signals EM1 to the plurality of pixels PX' on a row basis. Further, the second emission driver 855 may generate the second emission signals EM2 based on a second emission control signal EMCTRL2 received from the controller 860, and may sequentially provide the second emission signals EM2 to the plurality of pixels PX' on a row basis. In some embodiments, the first emission control signal EMCTRL1 may include, but is not limited to, a first emission start signal EM_FLM1 and a first emission clock signal, and the second emission control signal EMCTRL2 may include, but is not limited to, a second emission start signal EM_FLM2 and a second emission clock signal. In some embodiments, the first and second emission drivers 850 and 855 may be integrated or formed in the display panel 810. For example, the first emission driver 850 may be formed in a left peripheral region of the display panel 810, and the second emission driver 855 may be formed in a right peripheral area of the display panel 810, but are not limited thereto. In other embodiments, the first and second emission drivers 850 and 855 may be implemented as integrated circuits.

In the display device 800 according to embodiments, in response to a mode switching signal SMODE indicating switching from a first mode (e.g., one of a public mode, a private mode and an all-off mode) to a second mode (e.g., another one of the public mode, the private mode and the all-off mode), the panel driver 820 may gradually change an on-period ratio of at least one of the first emission signal EM1 and the second emission signal EM2 applied to each pixel PX' over a plurality of frame periods.

For example, when the mode switching signal SMODE indicates switching from the public mode to the private mode, as illustrated in FIG. 22, over a plurality of frame periods FP1, FP2, . . . , FPN, the panel driver 820 may gradually decrease an on-period ratio of the first emission signal EM1 applied to each pixel PX', and may gradually increase an on-period ratio of the second emission signal EM2 applied to each pixel PX'. In some embodiments, the on-period ratio of the first emission signal EM1 may be adjusted by adjusting an on-period ratio of the first emission start signal EM_FLM1 provided to the first emission driver 850, and the on-period ratio of the second emission signal EM2 may be adjusted by adjusting an on-period ratio of the second emission start signal EM_FLM2 provided to the second emission driver 855. That is, as illustrated in FIG. 22, on-periods OP1_1, OP1_2, . . . , OP1_N of the first emission signal EM1 may gradually decrease in the plurality of frame periods FP1, FP2, . . . , FPN, and on-periods OP2_1, OP2_2, . . . , OP2_N of the second emission signal EM2 may gradually increase in the plurality of frame periods FP1, FP2, . . . , FPN. Accordingly, the display device 800 may perform smooth mode switching from the public mode to the private mode without a Mura defect due to a threshold voltage distribution of the plurality of pixels PX'.

In another example, when the mode switching signal SMODE indicates switching from the private mode to the public mode, as illustrated in FIG. 23, over a plurality of frame periods FP1, FP2, . . . , FPN, the panel driver 820 may gradually decrease the on-period ratio of the second emission signal EM2 applied to each pixel PX', and may gradually increase the on-period ratio of the second emission signal EM2 applied to each pixel PX'. That is, as illustrated in FIG. 23, the on-periods OP2_1, OP2_2, . . . , OP2_N of the second emission signal EM2 may gradually decrease in the plurality of frame periods FP1, FP2, . . . , FPN, and the on-periods OP1_1, OP1_2, . . . , OP1_N of the first emission signal EM1 may gradually increase in the plurality of frame periods FP1, FP2, . . . , FPN. Accordingly, the display device 800 may perform smooth mode switching from the private mode to the public mode without the Mura defect due to the threshold voltage distribution of the plurality of pixels PX'.

As described above, in the display device 800 according to embodiments, at least one pixel PX' may include the first and second light emitting elements EL1 and EL2 having different viewing angles, and the panel driver 820 may gradually change the on-period ratio of at least one of the first signal (or the first emission signal EM1) for providing the driving current IDR to the first light emitting element EL1 and the second signal (or the second emission signal EM2) for providing the driving current IDR to the second light emitting element EL2 over the plurality of frame periods FP1, FP2, . . . , FPN in response to the mode switching signal SMODE. Accordingly, the display device 100 according to embodiments may perform the smooth mode switching without the Mura defect due to the threshold voltage distribution.

Figure 24:
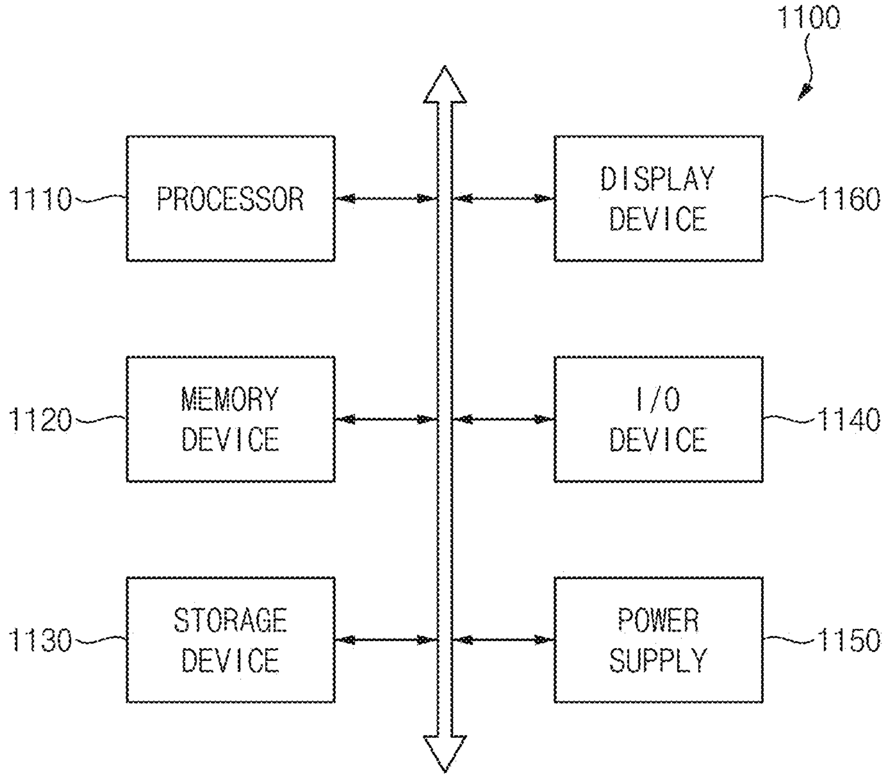
FIG. 24 is a block diagram illustrating an electronic device including a display device according to embodiments.

FIG. 24 is a block diagram illustrating an electronic device including a display device according to embodiments.

Referring to FIG. 24, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components via the buses or other communication links.

In the display device 1160, at least one pixel may include first and second light emitting elements having different viewing angles, and an on-period ratio of at least one of a first signal for providing a driving current to the first light emitting element and a second signal for providing the driving current to the second light emitting element may be gradually changed over a plurality of frame periods in response to a mode switching signal indicating switching from a first mode to a second mode. Accordingly, the display device 1160 according to embodiments may perform the smooth mode switching.

According to embodiments, the electronic device 1100 may be any electronic device including the display device 1160, such as a digital television, a 3D television, a personal computer (PC), a home appliance, a laptop computer, a cellular phone, a smart phone, a tablet computer, a wearable device, a personal digital assistant (PDA), a portable multimedia player (PMP), a digital camera, a music player, a portable game console, a navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a plurality of pixels; and a panel driver configured to drive the display panel, wherein at least one pixel of the plurality of pixels includes:

a first light emitting element having a first viewing angle;

a second light emitting element having a second viewing angle different from the first viewing angle;

a pixel circuit configured to generate a driving current;

a first transistor configured to provide the driving current to the first light emitting element in response to a first signal; and a second transistor configured to provide the driving current to the second light emitting element in response to a second signal, and wherein, in response to a mode switching signal, the panel driver gradually changes an on-period ratio of at least one of the first signal and the second signal over a plurality of frame periods.

2. The display device of claim 1, wherein the first viewing angle is a wide viewing angle, and wherein the second viewing angle is a narrow viewing angle that is narrower than the first viewing angle.

3. The display device of claim 1, wherein the first light emitting element is a public light emitting element configured to provide light to both of a first user located in front of the display device and a second user located on a side of the display device, and wherein the second light emitting element is a private light emitting element configured to provide light to the first user and not to provide the light to the second user.

4. The display device of claim 1, wherein the display device is mounted in a vehicle, and wherein, when the vehicle changes from a stationary state to a moving state, the panel driver receives the mode switching signal, which indicates switching from a public mode in which an image displayed by the display device is visible to both of a first user located in front of the display device and a second user located on a side of the display device to a private mode in which an image displayed by the display device is visible to the first user and invisible to the second user.

5. The display device of claim 4, wherein, when the vehicle changes from the moving state to the stationary state, the panel driver receives the mode switching signal, which indicates switching from the private mode to the public mode.

6. The display device of claim 1, wherein, when the mode switching signal indicates switching from a public mode to a private mode, the panel driver gradually decreases an on-period ratio of the first signal over a plurality of first frame periods, and gradually increases an on-period ratio of the second signal over the plurality of first frame periods, and wherein, when the mode switching signal indicates switching from the private mode to the public mode, the panel driver gradually decreases the on-period ratio of the second signal over a plurality of second frame periods, and gradually increases the on-period ratio of the first signal.

7. The display device of claim 1, wherein, when the mode switching signal indicates switching from a public mode to an all-off mode, the panel driver gradually decreases an on-period ratio of the first signal over a plurality of first frame periods, and wherein, when the mode switching signal indicates switching from the all-off mode to a private mode, the panel driver gradually increases an on-period ratio of the second signal over a plurality of second frame periods.

8. The display device of claim 1, wherein, when the mode switching signal indicates switching from a private mode to an all-off mode, the panel driver gradually decreases an on-period ratio of the second signal over a plurality of first frame periods, and wherein, when the mode switching signal indicates switching from the all-off mode to a public mode, the panel driver gradually increases an on-period ratio of the first signal over a plurality of second frame periods.

9. The display device of claim 1, wherein, when the mode switching signal indicates switching from a public mode to a private mode, the panel driver performs a first fade-out operation for switching from the public mode to an all-off mode by gradually decreasing an on-period ratio of the first signal over a plurality of first frame periods, and, after the first fade-out operation, performs a first fade-in operation for switching from the all-off mode to the private mode by gradually increasing an on-period ratio of the second signal over a plurality of second frame periods, and wherein, when the mode switching signal indicates switching from the private mode to the public mode, the panel driver performs a second fade-out operation for switching from the private mode to the all-off mode by gradually decreasing the on-period ratio of the second signal over a plurality of third frame periods, and, after the second fade-out operation, performs a second fade-in operation for switching from the all-off mode to the public mode by gradually increasing the on-period ratio of the first signal over a plurality of fourth frame periods.

10. The display device of claim 1, wherein the first signal is a first global signal that is substantially simultaneously applied to the plurality of pixels, and wherein the second signal is a second global signal that is substantially simultaneously applied to the plurality of pixels.

11. The display device of claim 1, wherein the pixel circuit includes:

a third transistor including a gate, a first terminal connected to a first power supply voltage line, and a second terminal;

a fourth transistor including a gate connected to a write signal line, a first terminal connected to a data line, and a second terminal;

a first capacitor including a first electrode connected to the first power supply voltage line, and a second electrode connected to the second terminal of the fourth transistor;

a second capacitor including a first electrode connected to the second terminal of the fourth transistor, and a second electrode connected to the gate of the third transistor;

a fifth transistor including a gate connected to a compensation signal line, a first terminal connected to the second terminal of the third transistor, and a second terminal connected to the gate of the third transistor;

a sixth transistor including a gate connected to an initialization signal line, a first terminal connected to the gate of the third transistor, and a second terminal connected to an initialization voltage line;

a seventh transistor including a gate connected to the compensation signal line, a first terminal connected to the first electrode of the second capacitor, and a second terminal connected to a reference voltage line;

an eighth transistor including a gate connected to an emission signal line, a first terminal connected to the second terminal of the third transistor, and a second terminal connected to the first and second transistors;

a ninth transistor including a gate connected to a bypass signal line, a first terminal connected to the first light emitting element, and a second terminal connected to an anode initialization voltage line; and a tenth transistor including a gate connected to the bypass signal line, a first terminal connected to the second light emitting element, and a second terminal connected to the anode initialization voltage line, wherein the first transistor includes a gate connected to a first global signal line, a first terminal connected to the second terminal of the eighth transistor, and a second terminal connected to the first light emitting element, and wherein the second transistor includes a gate connected to a second global signal line, a first terminal connected to the second terminal of the eighth transistor, and a second terminal connected to the second light emitting element.

12. The display device of claim 1, wherein the pixel circuit includes:

a third transistor including a gate, a first terminal, and a second terminal;

a fourth transistor including a gate connected to a write signal line, a first terminal connected to a data line, and a second terminal connected to the first terminal of the third transistor;

a fifth transistor including a gate connected to a compensation signal line, a first terminal connected to the second terminal of the third transistor, and a second terminal connected to the gate of the third transistor;

a first capacitor including a first electrode connected to a first power supply voltage line, and a second electrode connected to the gate of the third transistor;

a sixth transistor including a gate connected to an initialization signal line, a first terminal connected to the gate of the third transistor, and a second terminal connected to an initialization voltage line;

a seventh transistor including a gate connected to an emission signal line, a first terminal connected to the first power supply voltage line, and a second terminal connected to the first terminal of the third transistor;

an eighth transistor including a gate connected to the emission signal line, a first terminal connected to the second terminal of the third transistor, and a second terminal connected to the first and second transistors;

a ninth transistor including a gate connected to a bypass signal line, a first terminal connected to the first light emitting element, and a second terminal connected to an anode initialization voltage line; and a tenth transistor including a gate connected to the bypass signal line, a first terminal connected to the second light emitting element, and a second terminal connected to the anode initialization voltage line, wherein the first transistor includes a gate connected to a first global signal line, a first terminal connected to the second terminal of the eighth transistor, and a second terminal connected to the first light emitting element, and wherein the second transistor includes a gate connected to a second global signal line, a first terminal connected to the second terminal of the eighth transistor, and a second terminal connected to the second light emitting element.

13. The display device of claim 1, wherein the first signal is a first emission signal, which is sequentially applied to the plurality of pixels on a row basis, and wherein the second signal is a second emission signal, which is sequentially applied to the plurality of pixels on a row basis.

14. The display device of claim 1, wherein the pixel circuit includes:

a third transistor including a gate, a first terminal connected to a first power supply voltage line, and a second terminal connected to the first and second transistors;

a fourth transistor including a gate connected to a write signal line, a first terminal connected to a data line, and a second terminal;

a first capacitor including a first electrode connected to the first power supply voltage line, and a second electrode connected to the second terminal of the fourth transistor;

a second capacitor including a first electrode connected to the second terminal of the fourth transistor, and a second electrode connected to the gate of the third transistor;

a fifth transistor including a gate connected to a compensation signal line, a first terminal connected to the second terminal of the third transistor, and a second terminal connected to the gate of the third transistor;

a sixth transistor including a gate connected to an initialization signal line, a first terminal connected to the gate of the third transistor, and a second terminal connected to an initialization voltage line;

a seventh transistor including a gate connected to the compensation signal line, a first terminal connected to the first electrode of the second capacitor, and a second terminal connected to a reference voltage line;

a ninth transistor including a gate connected to a bypass signal line, a first terminal connected to the first light emitting element, and a second terminal connected to an anode initialization voltage line; and a tenth transistor including a gate connected to the bypass signal line, a first terminal connected to the second light emitting element, and a second terminal connected to the anode initialization voltage line, wherein the first transistor includes a gate connected to a first emission signal line, a first terminal connected to the second terminal of the third transistor, and a second terminal connected to the first light emitting element, and wherein the second transistor includes a gate connected to a second emission signal line, a first terminal connected to the second terminal of the third transistor, and a second terminal connected to the second light emitting element.

15. The display device of claim 1, wherein the pixel circuit includes:

a third transistor including a gate, a first terminal, and a second terminal;

a fourth transistor including a gate connected to a write signal line, a first terminal connected to a data line, and a second terminal connected to the first terminal of the third transistor;

a fifth transistor including a gate connected to a compensation signal line, a first terminal connected to the second terminal of the third transistor, and a second terminal connected to the gate of the third transistor;

a first capacitor including a first electrode connected to a first power supply voltage line, and a second electrode connected to the gate of the third transistor;

a sixth transistor including a gate connected to an initialization signal line, a first terminal connected to the gate of the third transistor, and a second terminal connected to an initialization voltage line;

a seventh transistor including a gate connected to an emission signal line, a first terminal connected to the first power supply voltage line, and a second terminal connected to the first terminal of the third transistor;

a ninth transistor including a gate connected to a bypass signal line, a first terminal connected to the first light emitting element, and a second terminal connected to an anode initialization voltage line; and a tenth transistor including a gate connected to the bypass signal line, a first terminal connected to the second light emitting element, and a second terminal connected to the anode initialization voltage line, wherein the first transistor includes a gate connected to a first emission signal line, a first terminal connected to the second terminal of the third transistor, and a second terminal connected to the first light emitting element, and wherein the second transistor includes a gate connected to a second emission signal line, a first terminal connected to the second terminal of the third transistor, and a second terminal connected to the second light emitting element.

16. A method of operating a display device in which at least one pixel includes first and second light emitting elements having different viewing angles from each other, the method comprising:

receiving a mode switching signal; and gradually changing an on-period ratio of at least one of a first signal for providing a driving current to the first light emitting element and a second signal for providing the driving current to the second light emitting element over a plurality of frame periods.

17. The method of claim 16, wherein receiving the mode switching signal includes:

receiving a first mode switching signal indicating switching from a public mode to a private mode, and wherein gradually changing the on-period ratio of at least one of the first signal and the second signal includes:

gradually decreasing an on-period ratio of the first signal over a plurality of first frame periods in response to the first mode switching signal; and gradually increasing an on-period ratio of the second signal over the plurality of first frame periods in response to the first mode switching signal.

18. The method of claim 17, wherein receiving the mode switching signal further includes:

receiving a second mode switching signal indicating switching from the private mode to the public mode, and wherein gradually changing the on-period ratio of at least one of the first signal and the second signal further includes:

gradually decreasing the on-period ratio of the second signal over a plurality of second frame periods in response to the second mode switching signal; and gradually increasing the on-period ratio of the first signal over the plurality of second frame periods in response to the second mode switching signal.

19. The method of claim 16, wherein receiving the mode switching signal includes:

receiving a first mode switching signal indicating switching from a public mode to an all-off mode; and receiving a second mode switching signal indicating switching from the all-off mode to a private mode, and wherein gradually changing the on-period ratio of at least one of the first signal and the second signal includes:

gradually decreasing an on-period ratio of the first signal over a plurality of first frame periods in response to the first mode switching signal; and gradually increasing an on-period ratio of the second signal over a plurality of second frame periods in response to the second mode switching signal.

20. The method of claim 19, wherein receiving the mode switching signal further includes:

receiving a third mode switching signal indicating switching from the private mode to the all-off mode; and receiving a fourth mode switching signal indicating switching from the all-off mode to the public mode, and wherein gradually changing the on-period ratio of at least one of the first signal and the second signal further includes:

gradually decreasing the on-period ratio of the second signal over a plurality of third frame periods in response to the third mode switching signal; and gradually increasing the on-period ratio of the first signal over a plurality of fourth frame periods in response to the fourth mode switching signal.

* * * * *